(12) United States Patent
Wilcox et al.

(10) Patent No.: US 10,890,395 B2
(45) Date of Patent: Jan. 12, 2021

(54) APPARATUS AND METHOD FOR ENERGY HARVESTING ROUND COUNTER FOR FIREARMS

(71) Applicant: ROGUE TECHNOLOGIES LLC, Clearfield, UT (US)

(72) Inventors: Andrew Wilcox, Clinton, UT (US); Cory Newman, Providence, UT (US); Mike Sorenson, Salt Lake City, UT (US)

(73) Assignee: Raoden Tech Consulting, LLC, Clinton, UT (US)

( * ) Notice: Subject to any disclaimer, the term of this patent is extended or adjusted under 35 U.S.C. 154(b) by 0 days.

(21) Appl. No.: 16/585,763

(22) Filed: Sep. 27, 2019

(65) Prior Publication Data

US 2020/0103190 A1  Apr. 2, 2020

Related U.S. Application Data

(60) Provisional application No. 62/738,264, filed on Sep. 28, 2018, provisional application No. 62/868,985, filed on Jun. 30, 2019.

(51) Int. Cl.
*F41A 19/01* (2006.01)
*G01H 11/08* (2006.01)

(52) U.S. Cl.
CPC ............ *F41A 19/01* (2013.01); *G01H 11/08* (2013.01)

(58) Field of Classification Search
CPC ................................ F41A 19/01; G01H 11/08
See application file for complete search history.

(56) References Cited

U.S. PATENT DOCUMENTS

| | | | | |
|---|---|---|---|---|
| 5,918,304 | A * | 6/1999 | Gartz | F41A 19/01 42/1.01 |
| 7,081,693 | B2 * | 7/2006 | Hamel | B60C 23/0411 307/151 |
| 7,143,644 | B2 | 12/2006 | Johnson et al. | |
| 7,443,301 | B2 * | 10/2008 | Tucker | B60C 23/041 340/572.8 |
| 7,614,333 | B2 * | 11/2009 | Quinn | F41A 19/01 42/1.01 |
| 7,716,863 | B1 | 5/2010 | Johnson et al. | |
| 7,747,415 | B1 * | 6/2010 | Churchill | F41A 17/06 702/187 |

(Continued)

*Primary Examiner* — Joshua T Semick
(74) *Attorney, Agent, or Firm* — Dentons Durham Jones Pinegar; Sarah W. Matthews

(57) ABSTRACT

An energy harvesting device for accurately counting rounds fired by a firearm comprises a piezoelectric element for mechanical coupling to the barrel of the firearm. The piezoelectric element may produce a voltage waveform in response to the mechanical vibrations from a round passing through the barrel, which may power a microcontroller. The microcontroller may determine the rate of change of the voltage waveform to determine if a live round was fired. The microcontroller may be in communication with an RFID chip. The microcontroller may read the value on the RFID chip, increment the value of the RFID chip in response to being turned on by the voltage waveform, and then store the incremented value on the RFID chip. An armorer may remotely check the value of the RFID chip.

18 Claims, 25 Drawing Sheets

(56) References Cited

U.S. PATENT DOCUMENTS

| | | | | |
|---|---|---|---|---|
| 8,046,946 B2 * | 11/2011 | Packer | ............... | F41A 19/01 |
| | | | | 324/200 |
| 8,290,747 B2 * | 10/2012 | Hamel | ............... | F41A 19/01 |
| | | | | 702/187 |
| 8,387,295 B2 * | 3/2013 | Glock | ............... | F41A 19/01 |
| | | | | 42/1.02 |
| 8,706,440 B2 * | 4/2014 | McNelis | ............. | F41A 19/01 |
| | | | | 434/19 |
| 9,273,918 B2 | 3/2016 | Amit et al. | | |
| 10,527,487 B2 * | 1/2020 | Pretorius | ............. | H04N 5/2257 |
| 2011/0252684 A1 | 10/2011 | Ufer et al. | | |
| 2013/0125438 A1 * | 5/2013 | Delgado Acarreta | ................. | |
| | | | | H01L 41/1136 |
| | | | | 42/1.03 |
| 2015/0226505 A1 | 8/2015 | Amit et al. | | |
| 2020/0011629 A1 * | 1/2020 | Deng | ............... | F41A 17/066 |

* cited by examiner

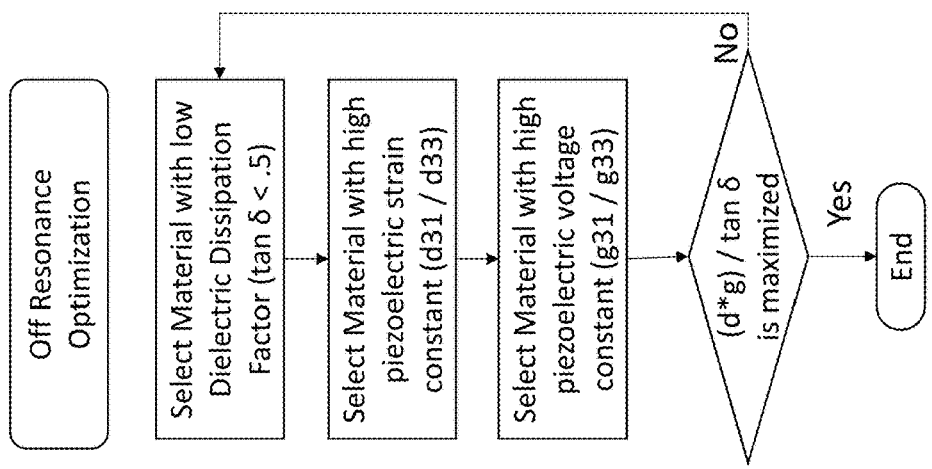
*FIG. 20*
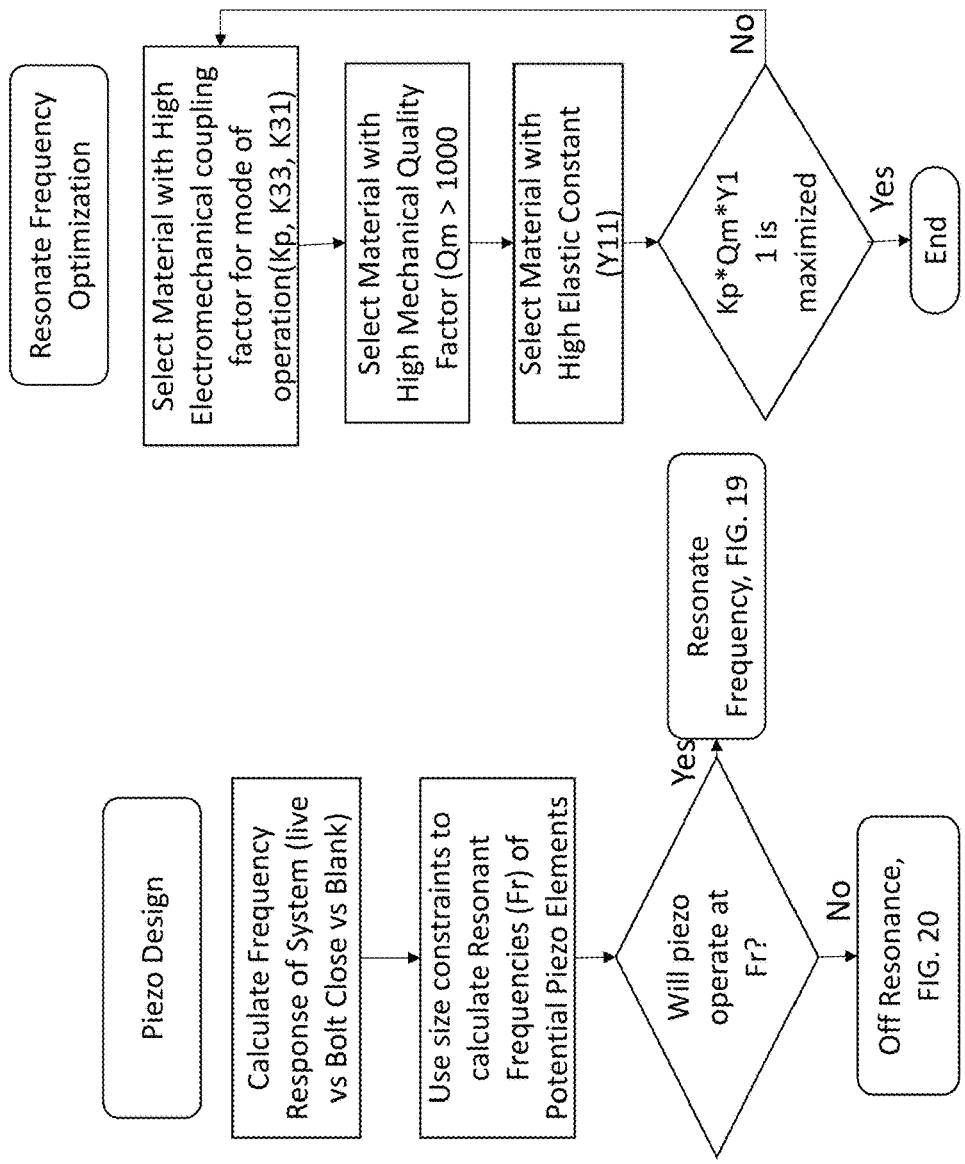
*FIG. 19*
*FIG. 18*

X-axis : 1mS/Div; Y-axis : 1V/Div

X-axis : 1mS/Div; Y-axis : 1V/Div

APPARATUS AND METHOD FOR ENERGY HARVESTING ROUND COUNTER FOR FIREARMS

TECHNICAL FIELD

The present invention relates generally to a shot counter for counting the number of rounds fired by a firearm. More specifically, the present invention relates to a method and apparatus for counting fired live and blank ammunition which harvests the energy from a fired round to provide power to the round counting device.

BACKGROUND

Military and law enforcement armorers are responsible for maintaining hundreds to thousands of firearms, with the prime responsibility of protecting each operator by ensuring firearm reliability. Ancillary responsibilities of armorers include: maintaining proper spare part inventory, tracking of serialized firearms, and minimizing the lifecycle costs of the firearms and associated equipment. Firearm maintenance and warranty schedules are specified by the manufacturer in terms of shots fired through the system. These schedules must be maintained to ensure firearm reliability. Evidence of maintenance adherence must be shown to have the manufacturer warrantee part replacements and repair costs. As a result, armorers spend a substantial portion of their time attempting to manually keep track of the number of shots fired through each of the hundreds (or thousands) of firearms under their control.

In the past, many armorers have attempted to solve this problem using estimation records, i.e. the armorer manually records requisitioned ammunition to the individual or unit and assumes full and equal use amongst the requisitioned. These records then dictate when parts need to be replaced to be within the manufacturer recommended maintenance schedule. The second methodology of firearm maintenance is, "fix when needed"; meaning the armorer maintains the firearm as malfunctions or part failures emerge. This method is highly inaccurate, and makes it difficult to prove who should cover the costs of repair, the manufacturer or the buyer. This approach also may lead to firearm failure during critical mission engagements.

More up-to-date methods include an accelerometer-based system where the battery, sensor, and electronics are stored mainly in the pistol grip of the firearm. These units are typically 90% accurate, as they sometimes misclassify bolt closure, high rates of fire, vibration, or dropped firearm as a shot fired. These solutions require batteries which augments the lifecycle cost of the firearm. Batteries are commonly changed before every mission, even when not needed due to the possibility of failure, leading to added waste and cost.

One known method discloses a method of counting shots fired which utilizes a separate power source such as a battery, solar panel, or a method of powering from the movement of parts of the firearm (like movement of the firearm bolt or hammer). However, even if a power source may be harvested from movement of the firearm, the round counting device is still always in the "on" state. Because the automatic round counting devices are always "on," they may lead to inaccuracies in counting, such as false positives from drops, other vibrations of the firearm, etc. Even if the round counter has software to analyze the time window of the vibration, this may still lead to false positives for other vibrations with similar time widows to a firearm shot. A similar technique is taught in U.S. Pat. No. 9,273,918, incorporated herein by reference in its entirety.

Additionally, crew-served weapons, or larger firearms that typically require 2 or 3 individuals to operate it effectively (examples include heavy machine guns such as a browning M240, Gatling guns such as the GAU-17/a, etc.), often have the barrel rotated during use. During heavy use of a crew-served weapon, the barrel is often rotated out with 2 or 3 other barrels to allow it to cool down, before it warps and causes damage to the firearm or operator injury.

Thus, there is a need to automatically track the number of shots fired by a firearm. Due to the limitations of battery-powered devices, it may be advantageous for the device to be battery-less. There is also a need for a device which is highly accurate to reduce or eliminate false positives. It may be advantageous for the device to be relatively simple and free from moving parts to reduce the chance of debris from the field, such as sand, dirt, etc., from impairing the function of the device. Additionally, it may be advantageous for armorers to be able to access the data relating to the number of rounds fired by firearms quickly to determine which firearms need maintenance.

SUMMARY

According to one aspect, a system is provided for determining the number of rounds fired by a firearm, the system may include: at least one piezo electric sensor configured to detect mechanical vibrations and generate and output one or more voltage waveforms representing the mechanical vibrations; a microcontroller in connection with the piezo electric sensor and a radio frequency identification chip.

According to one aspect, the system may further include the microcontroller being further programmed to receive the one or more voltage waveforms; a bridge rectifier may be in electrical communication with the piezo electric sensor; a capacitor in electrical communication with the bridge rectifier and the piezo electric sensor; a low pass filter in electrical communication with the bridge rectifier and the piezo electric sensor; and a means for regulating voltage electrically connected to the capacitor and the microcontroller.

According to another aspect, the radio frequency identification chip may be further electrically connected to the voltage regulator, and the microcontroller may be programmed to, when the microcontroller receives the one or more voltage waveforms, receive a stored value from the radio frequency identification chip, increment the stored value by one, and communicate the stored value back to the radio frequency identification chip.

In some configurations, the microcontroller may be programmed to turn on in response to the one or more voltage waveforms. In other configurations, the microcontroller may be powered only by the voltage waveforms of the piezo electric sensor.

According to another aspect, the microcontroller may be programmed to analyze the one or more voltage waveforms received from the piezo electric sensor. For example, the microcontroller may compare the one or more voltage waveforms to a pre-determined firing voltage waveform. The microcontroller may determine if the voltage waveform is smaller than the pre-determined firing voltage waveform.

According to another aspect, the microcontroller may be further programmed to, when the one or more voltage waveforms is not smaller than the pre-determined firing voltage waveform, take the following steps: read a previous round count value stored on the radio frequency identification chip, increment the previous round count value by one to form an updated round count value, and store the updated round count value on the radio frequency identification chip.

In another configuration, a method may be provided to determine the number of rounds fired by a firearm, the method comprising the steps of: selecting a piezo electric sensor; mounting the piezo electric sensor to a barrel of the firearm; sensing, by the piezo electric sensor, a mechanical vibration; converting, by the piezo electric sensor, the mechanical vibration into a voltage waveform; detecting the voltage waveform; determining the stored value on a radio frequency identification chip; incrementing the stored value on the radio frequency identification chip; and transmitting the stored value to the radio frequency identification chip.

In some aspects, additional steps in the method may include passing the voltage waveform through a bridge rectifier to produce a positive voltage, and collecting the positive voltage at a capacitor. In some configurations the positive voltage may pass through a means for regulating voltage to the microcontroller.

The step of detecting, by the microcontroller, the voltage waveform may comprise the microcontroller changing from an off state to an on state in response to the voltage waveform. In other configurations, the step of detecting the voltage waveform may comprise the step of comparing the voltage waveform to a predetermined firing voltage waveform; and, when the predetermined firing voltage waveform is equal to or smaller than the voltage waveform: determining the stored value on the radio frequency identification chip; incrementing, by the microcontroller, the stored value on the radio frequency identification chip; and transmitting, by the microcontroller, the stored value to the radio frequency identification chip.

According to yet another aspect, the system may be used to transmit a location of the firearm when the firearm is discharged. For example, the system may include a global positioning system transceiver that transmits the position of the firearm, and/or data relating to the firearm, when the firearm is discharged.

According to yet another aspect, a method is disclosed herein for determining the number of rounds fired by a firearm. The method may comprise the steps of: sensing, by a piezoelectric element in connection with the firearm, a vibration of the firearm, the vibration having a frequency; outputting, by the piezoelectric element, a voltage waveform representative of the vibration; powering a microcontroller in electrical connection with the piezoelectric element in response to the voltage waveform; receiving, by the microcontroller, a stored value from a non-volatile memory; determining, by the microcontroller, a rate of change of the voltage waveform, and when the rate of change is above a predetermined threshold, incrementing the stored value by one; and communicating, by the microcontroller, the stored value back to the non-volatile memory. In some configurations, the predetermined threshold may be about 1 mV/µS.

In some configurations, the method may further comprise the step of the microcontroller receiving a first measurement of the voltage waveform as the microcontroller is powered, and the microcontroller receiving a second measurement of the voltage waveform after the microcontroller receives the stored value from the non-volatile memory. The microcontroller may measure the rate of change of the voltage between the first measurement and the second measurement.

The method may further comprise the step of selecting the piezoelectric element, and wherein the step of selecting the piezoelectric element comprises determining the resonant frequency of the firearm at a selected location of the firearm for firing a live round, the selected location having the piezoelectric element connected thereto. In some configurations, the step of selecting the piezoelectric element comprises selecting the piezoelectric element having a resonant frequency proximal to the resonant frequency of the firearm at the selected location of the firearm for firing the live round. In other configurations, the step of selecting the piezoelectric element may include selecting the piezoelectric element having a resonant frequency similar to the resonant frequency of the firearm at the selected location of the firearm for firing the live round. In yet other configurations, the piezo electric element may have a resonant frequency of about 120 to about 150 kHz. A piezoelectric element having a high mechanical quality factor may also be used. In some configurations, the piezoelectric element may have a mechanical quality factor of at least 1000.

According to another aspect, a method for determining the number of rounds fired by a firearm may comprise the steps of: sensing, by a piezoelectric element in connection with the firearm, a vibration of the firearm; outputting, by the piezoelectric element, a voltage waveform representative of the vibration; powering a microcontroller in electrical connection with the piezoelectric element in response to the voltage waveform; and determining, by the microcontroller, a rate of change of the voltage waveform.

BRIEF DESCRIPTION OF DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

FIG. 18 is a flow chart of exemplary steps that may be taken in the design of a piezo electric element for use in a system as described herein.

FIG. 19 is a flow chart of exemplary steps that may be taken in optimizing performance of a piezo electric element at resonant frequency for use in a system as described herein.

FIG. 20 is a flow chart of exemplary steps that may be taken in optimizing performance of a piezo electric element at off-resonant frequency for use in a system as described herein.

DETAILED DESCRIPTION

Figure 1:
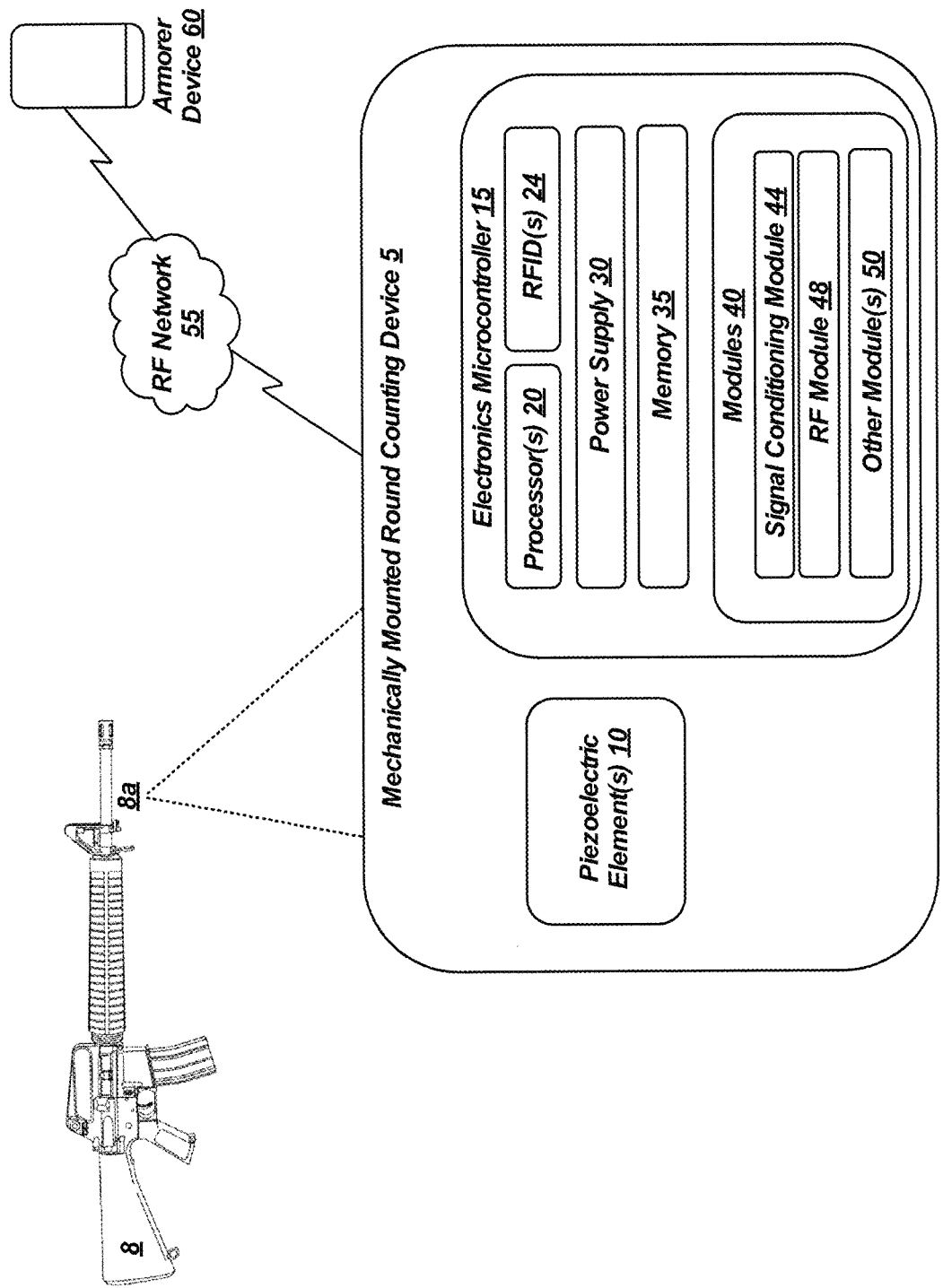
FIG. 1 is a block diagram of a round counting device described herein.

The following provides a detailed description of particular embodiments of the present invention. Reference will now be made to the drawings in which the various elements of the illustrated configurations will be given numerical designations and in which the invention will be discussed so as to enable one skilled in the art to make and use the invention. It is to be understood that the following description is only exemplary of the principles of the present invention, and should not be viewed as narrowing the scope of the claims which follow, which claims define the full scope of the invention.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. This facilitates the understanding of those skilled in the art by avoiding an unnecessarily redundant description. The accompanying drawings and the following description are provided in order for those skilled in the art to fully understand the present disclosure, and these are not intended to limit the gist disclosed in the scope of claims.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Reference in the specification to "one configuration" "one embodiment," "a configuration" or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

Before the present invention is disclosed and described in detail, it should be understood that the present disclosure is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or configurations shown unless expressly indicated as such. Likewise, the discussion of any particular aspect of the invention is not to be understood as a requirement that such aspect is required to be present apart from an express inclusion of the aspect in the claims.

It should also be noted that, as used in this specification and the appended claims, singular forms such as "a," "an," and "the" may include the plural unless the context clearly dictates otherwise. Thus, for example, reference to "a micro controller" may include one or more of such microcontrollers, and reference to "the sensor" may include reference to one or more of such sensors.

As used herein, the term "substantially" refers to the complete or nearly complete extent or degree of an action, characteristic, property, state, structure, item, or result to function as indicated. For example, an object, such as a sensor, that is "substantially" enclosed would mean that the object is either completely enclosed or nearly completely enclosed. The exact allowable degree of deviation from absolute completeness may in some cases depend on the specific context, such that enclosing nearly all of the spring would be substantially enclosed, even if the distal end of the structure enclosing the clamp had a slit or opening formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it lacked a bottom.

As used herein the term "generally" refers to something that is more of the designated adjective than not, or the converse if used in the negative. For example, something maybe said to be generally circular even though it has a somewhat oval shape or is polygonal rather than being completely smooth.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

For a firmware, and/or software implementation, the methodologies to count rounds fired by a firearm can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit. Memory can be implemented within the processing unit or may be external to the processing unit. As used herein the term "memory" refers to any type of long term, short term, volatile, nonvolatile, or other storage devices and is not to be limited to any particular type of memory or number of memories, or type of media upon which memory is stored.

In another firmware and/or software implementation, the functions may be stored as one or more instructions or code on a non-transitory computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The manner in which the systems and methods may be implemented is explained in details with respect to the figures. While aspects of described systems and methods can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

Figure 2:
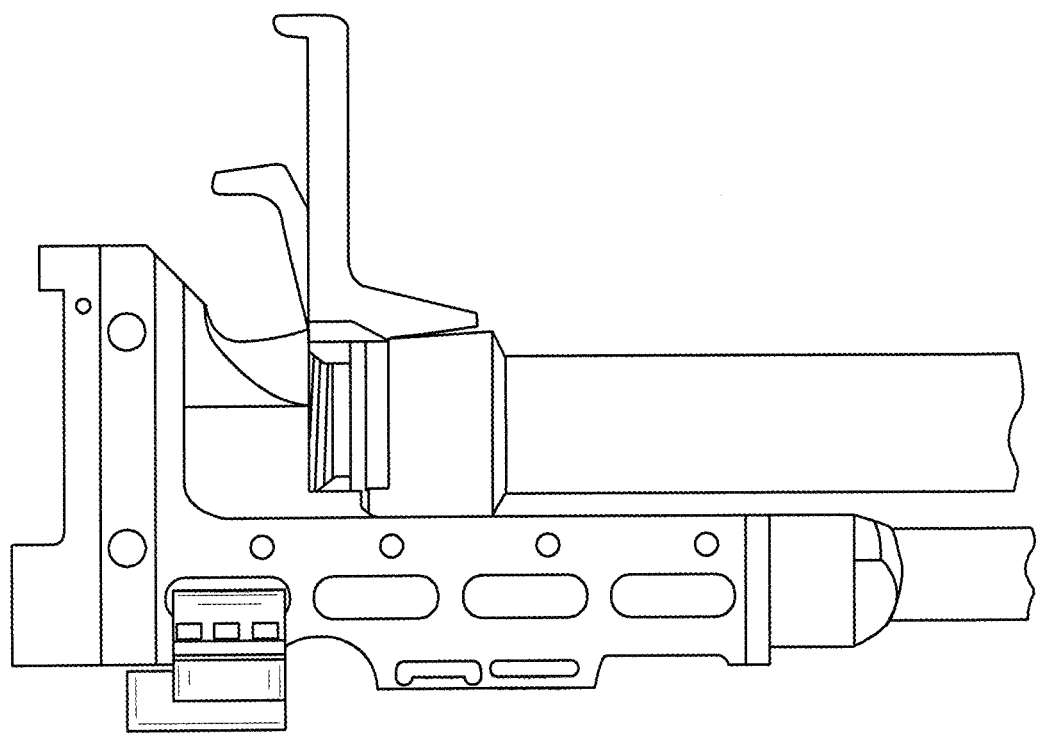
FIG. 2 shows a cut-away view of placement of the device on a trunnion of a crew-served weapon.

The present disclosure relates generally to a firearms round counter. One particular embodiment of the present invention is shown and described in a firearm round counter of FIG. 1. FIG. 1 is a block diagram of a firearm round counter according to one aspect of this disclosure. The device 5 may consist of one or more piezoelectric elements 10 in electrical communication with a microcontroller or electronics controller 15. The device comprising the piezoelectric element(s) 10 and microcontroller 15 may be mechanically mounted to the barrel 8*a* of a firearm 8. Any suitable mounting or connection type may be used, such that the piezoelectric element(s) 10 are in contact with the barrel 8*a* so that the piezoelectric element(s) 10 is coupled to any mechanical energy of the barrel. That is, the round counting device 5 is coupled to the barrel 8*a* such that the distortion of the barrel 8*a* (barrel expansion, shock and vibration) that occurs when a round is fired through it may be felt by the piezo element(s) 10. In other configurations, the round counting device 5 may be mounted or coupled to the weapon on a location other than the barrel. For example, it may be connected to the trunnion of the weapon for a crew-served weapon where the barrel is changed out frequently. FIG. 1 shows the device mounted to the barrel 8a of a weapon, while FIG. 2 shows a cut-away view of placement of the device on a trunnion of a crew-served weapon.

Figure 3:
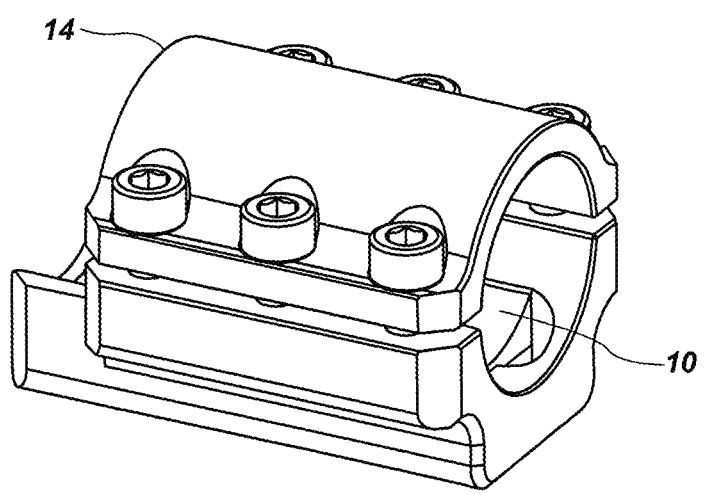
FIG. 3 is a perspective view of a mount that may be used according to the disclosure herein.
Figure 4:
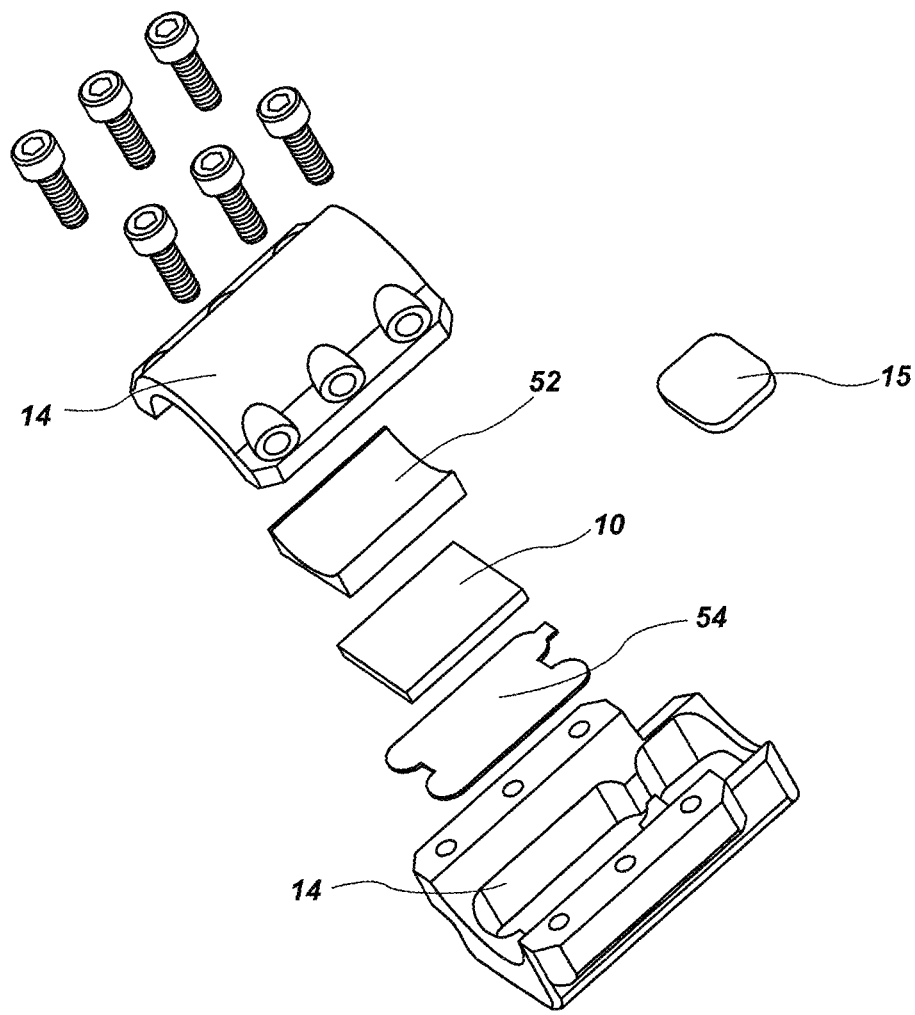
FIG. 4 is an exploded view of one possible mount configuration described herein.

FIG. 3 shows a perspective view of a mechanical mount 12 that may be used to mount on a barrel of a weapon, and FIG. 4 shows an exploded view of the mount of FIG. 3. The mechanical mount 12 may secure the piezo element(s) 10 to the barrel or other portion of the weapon. Because of the heat conditions in the barrel of the weapon, the mechanical mount may also work to reduce thermal coupling. The mechanical mount 12 may also protect the electronics from outside environmental conditions. In some conditions, the mount 12 may be constructed from lightweight materials that provide protection to withstand the military environmental standards, and be attractive to adopting the device for small arms where weight is important. For example, the housing 14 of the mount may be formed of aluminum, such as an aluminum 7075 alloy. Coupling to the barrel of the weapon may mean the system is exposed to very high heat. While piezo elements can withstand temperatures upwards of 300 Celsius, electronic components cannot, so it may also be desirable for the mount 12 to act as a heat sink and pull the excess heat away from the electronics. The top portion of the housing can be configured with one or more holes, grooves, etc., to create more surface area exposed to air to further act as a heat sink. Additionally, the electronics, including microcontroller 15 may be mounted to the bottom side of the mount. The piezo element(s) 10 may also be mounted closer to the barrel/weapon compared to the microcontroller 15 and circuitry since the piezo can withstand higher temperatures. The mount 12 may also include a spacer 52 (shown is a curved spacer for use in the case of mounting on a barrel, but other shapes may be used for mounting on other locations of a weapon) to space the piezo to the weapon. The mount 12 may also include one or more seals 54 to seal the electronics portion from environmental hazards to the electronics such as water, dust, etc.

Any suitable mechanical piezoelectric sensor may be used. For example, bulk piezo material such as PZT, or a film piezo material such as MFC or other film piezo material could be used. Piezo crystals, ceramics, plastics or polymers may be used. In some configurations, more than one piezoelectric sensor may be used. The piezoelectric sensor 10, as stated above, may be mounted to the barrel 8a such that it may detect mechanical vibrations of a barrel 8a of a firearm 8, and output one or more voltage waveforms representing the mechanical vibrations of a barrel 8a. As the barrel of the weapon deforms when a projectile goes through it, the piezo element is compressed as an impulse event. In some configurations, it has been found that piezo ceramics are effective.

In some configurations, a single piezo element 10 may be used. In other configurations, multiple piezo elements may be used. When multiple piezo elements are used for the piezo sensor 10, they may be connected in any suitable manner, such as multiple piezo elements connected in a parallel or piezo stack configuration. The piezo element(s) 10 may be used in resonant frequencies in some configurations and in other configurations the piezo element(s) 10 need not be used in resonant frequencies. In one exemplary configuration, the piezoelectric elements 10 may comprise Navy Type I (PZT4), II (PZT5A), or V(PZT5J), (even more specifically, steminc SM111 and SM412) materials, polarized to operate in radial mode, with physical dimensions of a 15 mm diameter disc with a thickness of 1 mm, with three connected in a parallel stack configuration. In other configurations, stack configurations with between 2 to 10 single layers in parallel may be used. In other configurations, a cymbal transducer may be used. In yet other configurations, piezoelectric polymers (such as PVDF) may be used. It will be appreciated that in some configurations, a combination of stack configurations, cymbal transducers, and/or piezoelectric polymers, etc., may be used.

According to one aspect, the piezoelectric element may be optimized for both the type of weapon used and the location of the mounted system on the weapon. The piezoelectric element may be selected for its shape, size, thickness, and type of material in order to optimize performance of the system. In some configurations, due to tuning and selection of the piezo electric element, no additional battery or other source of power is needed in order to detect an event (such as a blank being shot, a live round, etc.) nor to process the waveform as a result of the event. Thus, the piezo electric element may be tuned to both a particular weapon and to a location of the sensor on the particular weapon. The process for tuning the piezoelectric element may comprise the steps of first determining the resonant frequency of the mechanical component the piezoelectric element is placed on, or the resonant frequency of the system.

For example, the barrel of the weapon typically vibrates at a particular frequency different from the trunnion of the same weapon. Just as the frequency response of the barrel or trunnion will be different, the frequency response from closing the bolt will be different from a round being fired when mounted in the same location. Once the different frequency responses are known, the piezo may be tuned by adjusting the shape, size, thickness, and type of piezoelectric material. For example, a piezoelectric element that has a material with a mechanical quality factor (q-factor) that resonates at a similar frequency to a live round for the particular location on the weapon may be selected. The mechanical quality factor value is important in evaluating the magnitude of the resonant strain. The vibration amplitude at an off-resonance frequency is amplified by a factor proportional to the mechanical quality factor at the resonance frequency. Other characteristics of the piezo material such as strain constant, voltage constant, coupling factor, etc., may also be optimized for use in the system.

It will be appreciated that many factors affect the resonant frequency. For example, the frequency of a live round of standard 5.56 ammo (using an AR-15) with a 15 mm diameter sensor placed 5" from barrel crown may be around 20 kHz. The farther the sensor is placed from the barrel crown, the faster the projectile will be moving and thus increase the frequency. In contrast, making the sensor larger decreases the frequency. The frequency of a bolt closure for an AR-15 with 16" barrel and a 15 mm diameter sensor placed 5" from the barrel crown may be around 5 kHz.

The dimensions of the piezo and polling direction of the material dictate at what frequencies the piezo typically resonates. In some configurations, it may be desirable to configure the resonate frequency of the system to match the resonant frequency of the piezo as this frequency is when the piezo is most efficient at converting mechanical energy to electrical energy. But this may not be possible due to size constraints, etc., and thus in some configurations it may be desirable to choose a piezoelectric material that has a very large or high mechanical quality factor, as this widens the bandwidth of the resonant frequency. This may allow more energy to be harvested if the piezoelectric element resonates close to that frequency. If the resonant frequency can be achieved, it may be desirable to choose a piezoelectric material having a small mechanical quality factor, as this may tune the piezo to only create the necessary energy at the frequency of, for example, a round being fired and dampening the energy of a bolt closure, ensuring accuracy of the device. For example, the mechanical quality factor may be from about 20 to about 2500. For a wide resonance bandwidth piezo element, a mechanical quality factor of about 1000 or greater may be desired. For a narrow resonance bandwidth, a mechanical quality factor of about 100 or less may be desired.

Energy harvesters that most often operate at resonant frequency use a cantilever configuration and use a thin film instead of a ceramic. In some configurations, it may be desirable to use ceramics since they generate greater power output even if the piezoelectric element is not operating at resonant frequency.

The piezo material also determines the dielectric constants and conversion constants and efficiency. Some materials create a large voltage but very little current, while others create greater charge and lower voltage. In some configurations, the step of optimizing the piezo electric material includes consideration of the dielectric constants and conversion constants and efficiency. Another aspect to tuning the piezo may be the size of the electrodes attached to the ceramic. The electrodes are typically silver and cover both sides, but by changing the surface area of the electrodes one may adjust the capacitance of the piezo element, and to be more efficient at converting energy, including matching the capacitance of the piezo to the capacitance of the electrical circuit. FIGS. 18-20 show flowcharts for steps that may be taken in optimizing performance of the piezo electric element depending on the type of system (resonant or off-resonant frequency). FIG. 18 is a flow chart of exemplary steps that may be taken in the design of a piezo electric element for use in a system as described herein. FIG. 19 is a flow chart of exemplary steps that may be taken in optimizing performance of a piezo electric element at resonant frequency for use in a system as described herein. FIG. 20 is a flow chart of exemplary steps that may be taken in optimizing performance of a piezo electric element at off-resonant frequency for use in a system as described herein.

In one specific configuration, given by way of example and not of limitation, the system may need about an average of 8 mW of power for about 6 mS to power the controller and log a round fired. To achieve that level of power, the piezo element may be optimized to transfer maximum power when a round is fired. It may be desirable to maximize the efficiency of converting mechanical energy to electrical energy (piezo element), and then transfer that electrical energy from the piezo element to a PCB/controller (i.e., match output impedance of the piezo element to the input impedance of the circuit that includes the controller). Working backwards, the storage capacitor (which in some configurations may be 1 uF, but can be larger or smaller) in this specific configuration needs to provide about 2V at 4 mA for 6 mS. This capacitance may be matched to the impedance of the piezo for max power transfer, so the piezo element in this configuration may be selected to have a 1 µF capacitance.

Piezo capacitance is modified by dieletric permittivity of the material, surface area of the electrode, and thickness of the piezo transducer. Most piezo ceramics have very low capacitance in the range of pF to 10 nF. To get to the µF range, a stack configuration of multiple thin piezo elements sandwiched together in parallel may be used. By changing various aspects such as the number of layers (more increases capacitance), thickness (thinner increases capacitance), and geometry of the electrode plating (larger surface area increases capacitance), it may be possible to generally match or come close to matching the output impedance of the piezo element to that of the input impedance (storage capacitance) of the circuit to achieve maximum power transfer (which occurs at 50% efficiency). Impedance changes with frequency, so the impedance calculation to optimize piezo efficiency may use the frequency response of a round being fired versus bolt closure and blanks (for example, in one configuration, this may be about 20 kHz for a round being fired versus about 6 kHz for a bolt closure).

Figure 5:
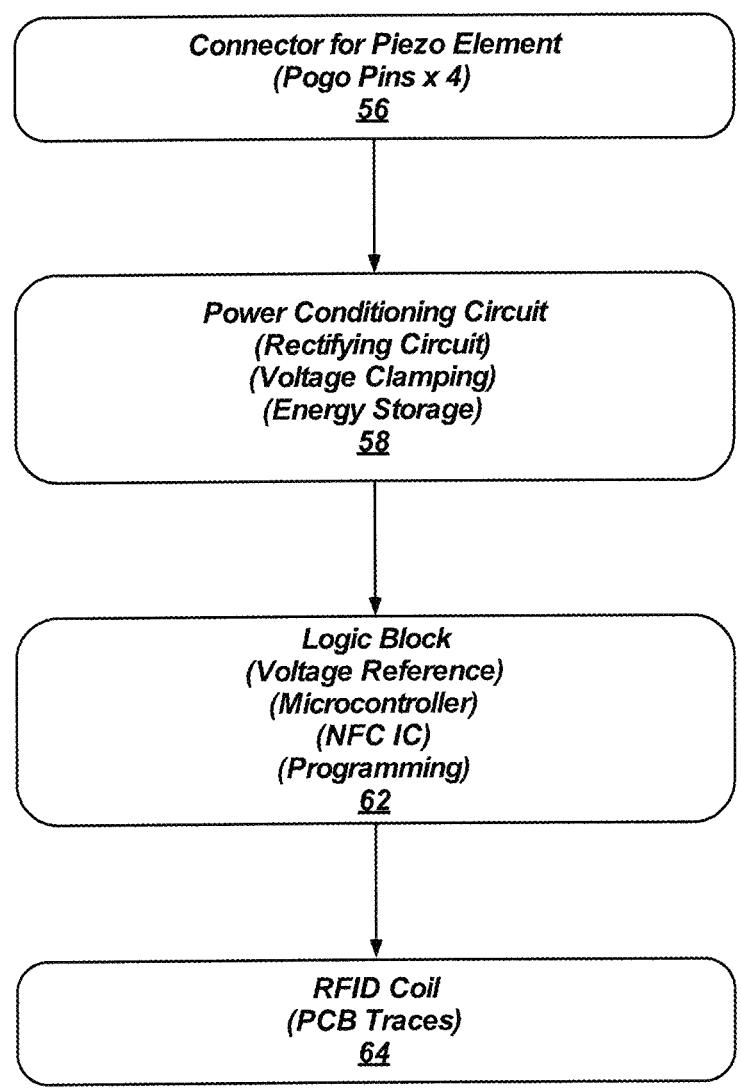
FIG. 5 is a block diagram of hardware that may be used for the electrical components disclosed herein.

FIG. 5 shows a schematic of components which may be used for the electronics, such as a connector 56 to connect the piezoelectric element to the circuitry, a power conditioning circuit 58, a logic block 62, and an RFID coil 64. The piezoelectric sensor 10 may be in electrical connection with the electronics and microcontroller 15. For example, the piezo electric element 10 may be in connection with the circuit/microcontroller via a connector or a solder. In one configuration shown in FIG. 5, the connector comprises a pogo pin connection. For example, 4 pogo pins (2 GND and 2 VCC) may be used to add redundancy and stability, and allow for slight unevenness while epoxying the electronics to the bottom of the mount. The electronics may be mounted in the bottom portion of the housing, with the pogo pins protruding up into the mount. The piezo element may then be pressed onto the pogo pins when the mount is secured to the barrel. In some configurations, the piezoelectric sensor 10 may be in direct electrical connection with a power supply 30 as described in additional detail below.

The microcontroller 15 may generally comprise one or more processors 20, radio frequency identification chip(s) 24, a power supply 30, a memory 35, and one or more modules 40 (see FIG. 1). The modules may be programmed to allow the microcontroller 15 to execute one or more functions. For example, a signal conditioning module 44 may be programmed to analyze a voltage waveform received at the microcontroller 15 from the piezoelectric sensor 10, where the voltage waveform received at the microcontroller 15 represents mechanical vibrations sensed by the piezoelectric sensor 10. A RF or radio frequency module 50 may allow the microcontroller 15 to communicate with the RFID chip 24, including receiving values on the RFID chip 24, incrementing the value received, and instructing the RFID chip to store the new incremented value. Incrementing the value received, for example, may include adding one to the value received. Typically this number may be expressed in whole integers.

In some configurations, the system also comprises a network 55. This network may include a radio wave network which allows a device, such as armorer device 60, to read the value on the RFID chip 24. The device 60 may include any suitable RFID reader. It will be appreciated that using RFID may have the advantage of not requiring a direct line of sight to be read. Additionally, RFID tags are able to be rewritten and reused, RFID tags can be durable against impact and environmental factors, RFID readers can read hundreds of tags within seconds, and RFID tag data is encrypted and can be locked for extra security. Other types of networks 55, such as wireless, Bluetooth, IR, Zigbee, etc., are possible and contemplated herein.

Figure 6:
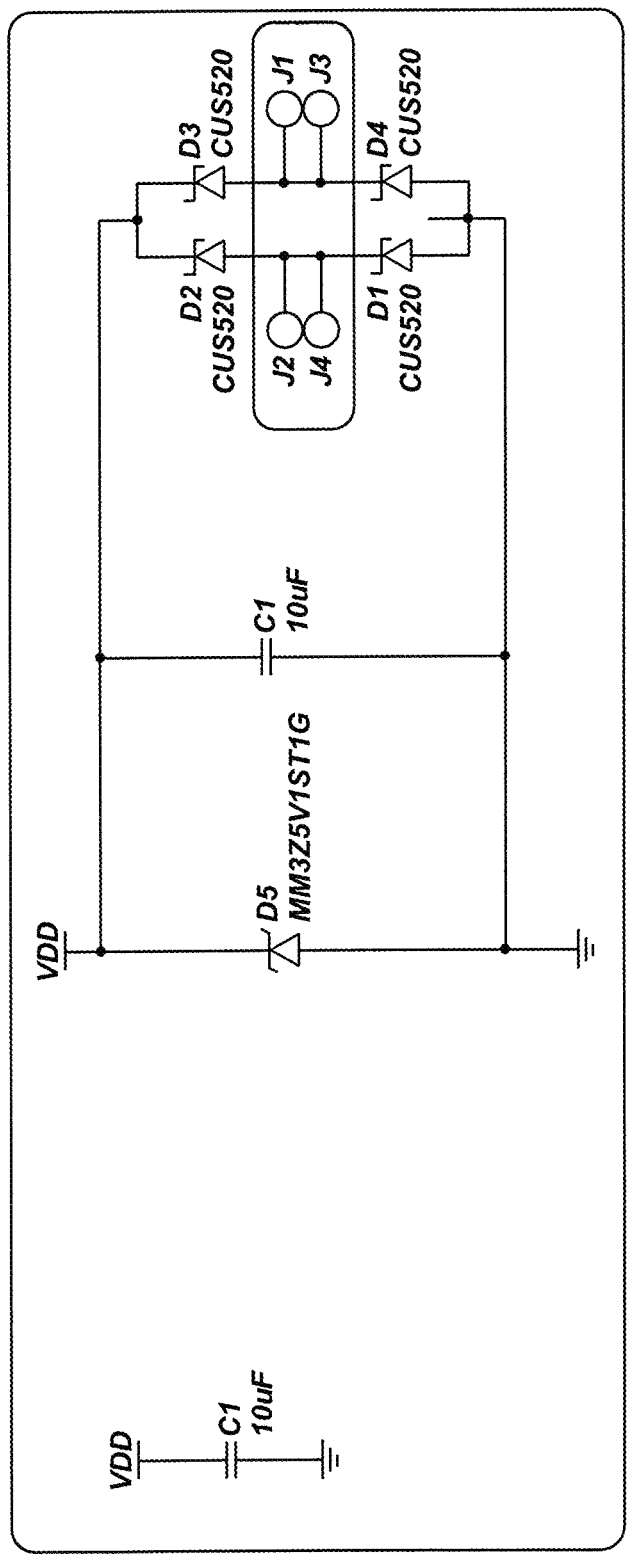
FIG. 6 is a schematic of circuitry that may be used for the power conditioning circuit disclosed herein.

Turning now to FIG. 6, there is shown a schematic of a circuit that may be used in conjunction with the present disclosure as the power conditioning circuit. According to one aspect of the present disclosure, the round counting device 5 is not provided with a battery or separate power source. In some configurations, the round counting device 5 may be powered only by harvesting the energy of the mechanical vibrations of a barrel 8a (FIG. 1) as a result of a round being fired. That is, when a round is fired, the shockwave produces a mechanical force on the piezoelectric element 10 coupled to the barrel 8a of the firearm 8 which is harvested to power the microcontroller 15.

The source of electrical power may be the piezoelectric element 10. The connections for the piezoelectric element are shown as J1-J4 in FIG. 6. The circuit may also generally consist of rectifying diodes in a bridge configuration, energy storage capacitors, and a voltage clamping diode. The circuit may function to time vary the signal of the piezo element, and rectify it (such as with low dropout Schottky diodes in a full wave bridge rectifier circuit). The rectified signal may then be stored in an energy storage capacitor (1 uF-10 uF) to provide a stable voltage level for the rest of the electronics for several milliseconds. A larger capacitor may give more time for circuit, but lowers the voltage level. A Zener diode may also be used in the circuit to clamp the voltage below the maximum voltage level for the rest of the electronics. An additional element in the circuit may include a delay circuit to allow for more energy from the transducer to be captured in the storage capacitor before the rest of the circuit turns on, providing the proper time window so that the voltage of the circuit does not drop below the minimum required for the circuit.

In some configurations, as the piezoelectric element 10 is mechanically vibrated by a round being fired through the barrel 8a of a firearm 8, the piezoelectric element may convert the mechanical energy into one or more voltage waveforms. As the piezoelectric element 10 compresses and stretches, it produces a voltage waveform that swings both positive and negative. This waveform may pass through a bridge rectifier to produce a positive voltage. In such a configuration, the piezoelectric element 10 may be in electrical connection with the bridge rectifier. Bridge rectifier may comprise four diodes in a bridge circuit configuration to provide an output of the same polarity for an input of either polarity. Bridge rectifier may comprise a full wave bridge rectifier in order to convert the alternating current input from the piezoelectric element 10 into a direct current output. In other configurations, a low pass filter may be in electrical communication with the bridge rectifier and the piezo electric sensor. For example, a resistor and capacitor between the piezo electric sensor and the bridge rectifier may reduce the charge from a bolt closure and improve detection of a blank or live round being fired.

The direct current output from the bridge rectifier may be stored in one or more capacitors, and the capacitor(s) may power the microcontroller 15 through a means for regulating voltage, such as a fixed voltage regulator. In some configurations, a diode may be used as a means for regulating voltage. The voltage regulator may provide a fixed voltage to power the microcontroller 15 and RFID chip 24. When enough charge is stored on capacitor, as controlled by the voltage regulator, the microcontroller 15 may be powered. The system may also be powered when an armorer uses an RFID reader to read the data stored in the system.

Figure 7:
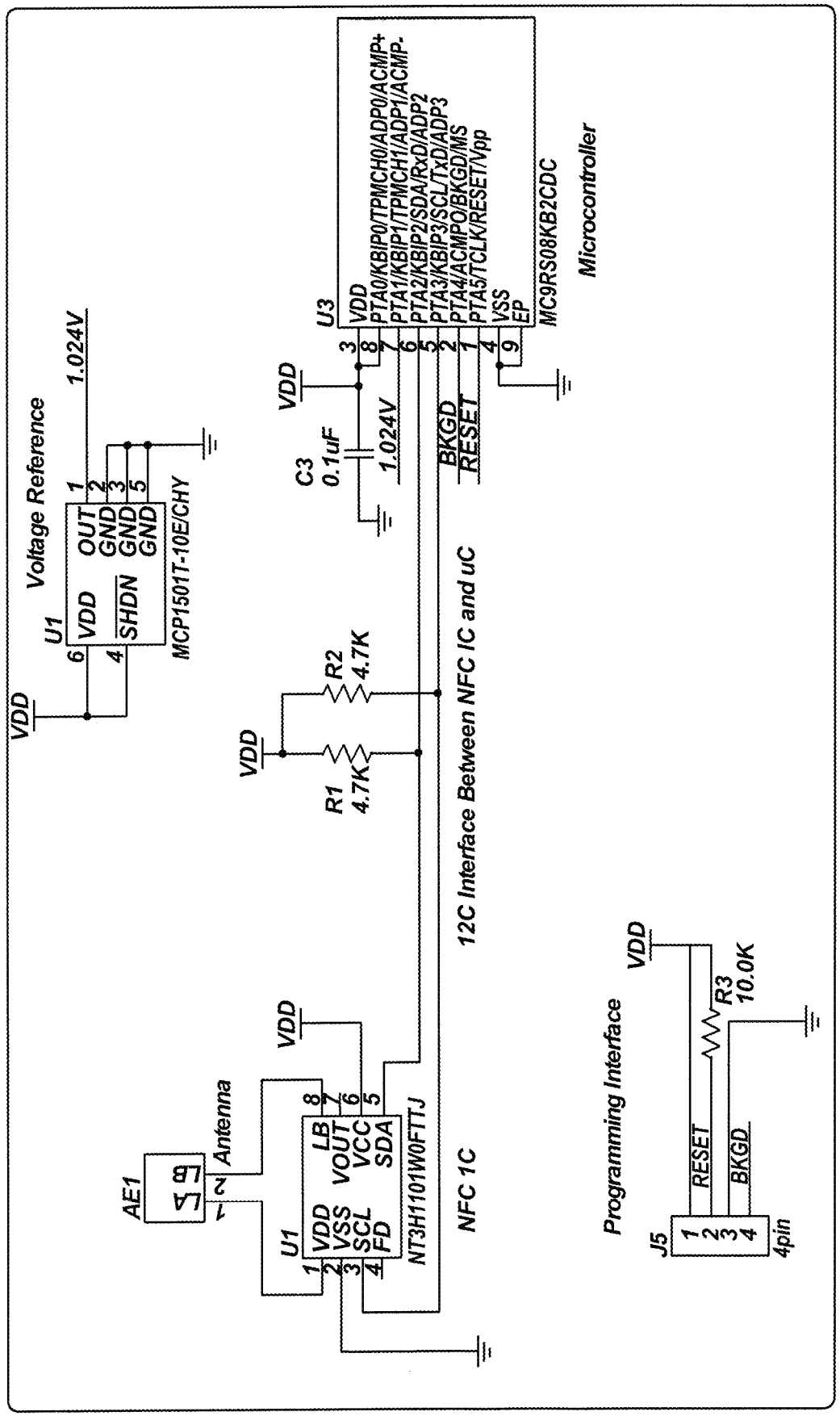
FIG. 7 is a schematic of circuitry that may be used in conjunction with the logic block disclosed herein.

FIG. 7 shows a schematic of a circuit that may be used in conjunction with the present disclosure for the logic block. The circuit may generally comprise a voltage reference, a microcontroller in communication with an NFC IC via I2C interface, and programming interface header for programming firmware onto the microcontroller. The microcontroller may be programmed to perform signal analysis of the voltage and current waveform to determine what type of event or round was fired, as described in more detail below. The uC can also be used to provide a real time clock source for accurate tracking of when the firearm was fired in future versions, as well as timer and analog to digital conversions. A voltage reference may be provided for precise measurement of the waveform. The uC may communicate with the RFID chip, via any suitable method, and in some configurations it may communication via I2C protocol. The RFID chip selected may use HF RFID and NFC protocol. Other protocols may be used. It may also contain a non-volatile EEPROM to store data values of interest.

The RFID coil 64 may allow an RFID reader to query the device. When an RFID reader is in close proximity (in some configurations, for example, less than 3 centimeters away) with the microcontroller 15 and electronics, it may provide power to the RFID chip to enable the RFID reader to read the contents of its memory, allowing for the retrieval of important data such as round count and chain of custody for the firearm. The coil may be tuned for the RFID frequency being used and can take many different sizes. For example, a 20 mm×25 mm antenna design may be used. This size may be decreased substantially and such is anticipated for custom RFID readers. A custom RFID reader, for example, may contain a reader mechanism that can be placed through slots of the handguard of a weapon (or at another location for a crew-served weapon, for example) to read the device quickly.

The circuit may also include a battery allowing for collection of GPS data, and real time clock data in order to better track the use of the firearm and its location. Additionally Bluetooth radios or other low energy radio signals could be added to transmit that data back to mesh network for inventory tracking or asset monitoring and IoT integration with other sensors.

The microcontroller 15 may be programmed to turn on in response to the one or more voltage waveforms output by the piezoelectric element 10. The RFID chip 24 may also be electrically connected to the voltage regulator to be powered by the piezoelectric element 10. The microcontroller 15 may thus turn on when a round is fired through barrel 8a, read the previous stored value of round count stored on the RFID chip, increment the value, and store it back to the RFID chip.

The RFID chip can be accessed through the antenna interface at any time to read the values stored in the chip. The RFID chip may also be a passive chip which draws power from an RFID reader. The RFID reader (such as armorer device 60) may send out electromagnetic waves that induce a current in the antenna of the RFID chip 24. In some configurations, the RFID chip may be configured to be both powered by the piezoelectric element 10 and also passively provided with power from an RFID reader.

Once the microcontroller 15 is turned on in response to the voltage waveform from the piezoelectric element 10, the microcontroller 15 may either automatically increment the stored value on the RFID chip 24, or the microcontroller 15 may utilize one or more modules 40 in order to accurately count the round fired. In one configuration, the RF module 48 may allow the microcontroller to receive a stored value from the RFID chip 24, or the microcontroller may retrieve the stored value from the RFID chip 24. The microcontroller may then increment the stored value by one, and communicate the incremented value back to the RFID chip 24 to be stored.

In another configuration, the signal conditioning module 44 (FIG. 1) may further analyze the voltage waveform received by the microcontroller. For example, the signal conditioning module may compare the voltage waveform received to a stored voltage waveform. The stored voltage waveform may be, for example, a voltage waveform from a known round firing. Or, the stored voltage waveform may be, for example, a voltage waveform from a known drop of the firearm. The signal conditioning module 44 may be programmed to analyze the voltage waveform received and compare it to known voltage waveforms in order to accurately count the voltage waveform received as a round fired or not. For example, the system may include an integrator circuit or accumulator to measure both the charge produced and the duration of the charge. The resulting waveform may then be compared to known, stored waveforms (such as those shown in FIGS. 12 through 17). For example, a comparator may be used to determine if the voltage has reached a predetermined low threshold voltage (for example 3.3 volts), at which point the accumulator would be enabled until the comparator dropped back below a predetermined voltage (for example 1.5 volts). The value of accumulator could then be examined, or the waveform during that period could go through an analog-digital converter and the resulting waveform analyzed for its characteristic peaks and total number. Many small peaks would be characteristic of noise, and single larger peaks with predefined time interval minimums could be equated to firearm events. Analyzing just the value in the accumulator may equate to the total charge of each type of event. In some configurations it may be advantageous to only have enough charge to power "on" the circuit and perform the necessary reading and writing of values for both a live round being fired and a blank being fired. Both scenarios would produce different amounts of charge and would allow the system to query the accumulator to see how much charge was acquired, and read and write the correct value in the RFID chip to update the data with the correct counter.

In some configurations, it may not be necessary, and in some specific settings it may be unadvisable to further analyze the waveform. The microcontroller may be built such that it does not turn on unless a voltage waveform from a round fired is received. For example, the circuit in FIG. 2 may be provided with a voltage regulator/capacitor/diode which has a predetermined low voltage threshold to turn on the microcontroller.

Figure 8:
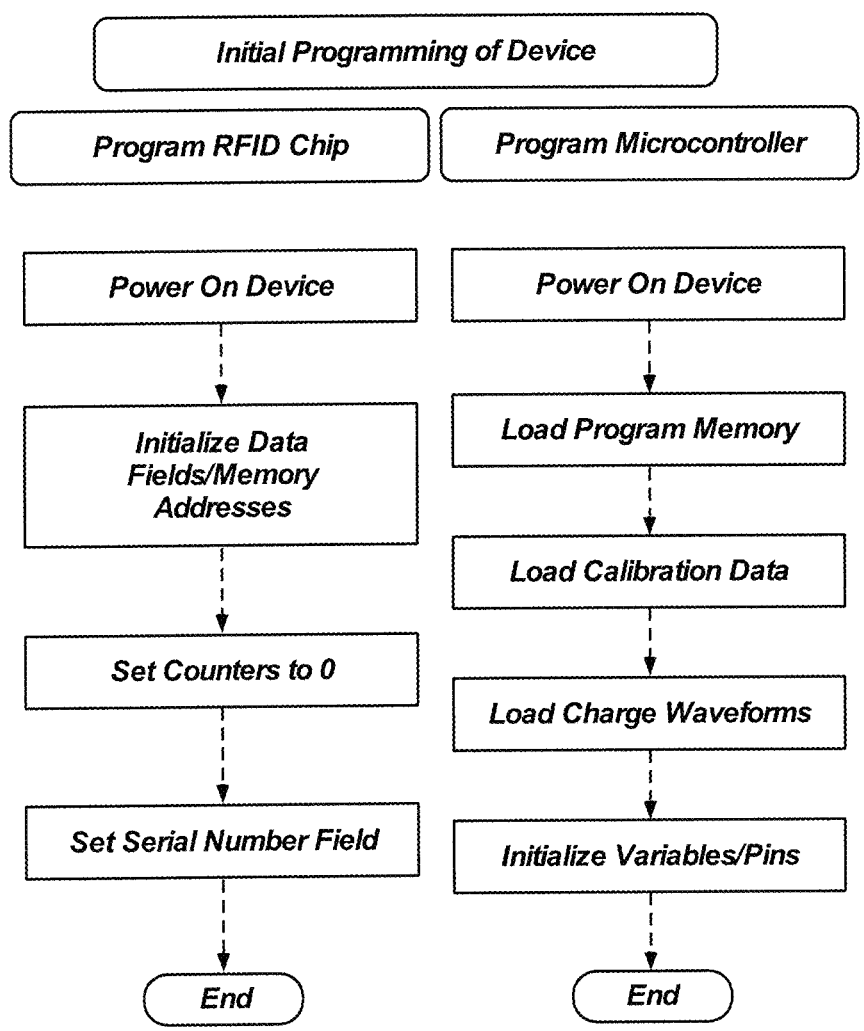
FIG. 8 is a flow chart of steps that may be taken at the initial programming of the system described herein.
Figure 9:
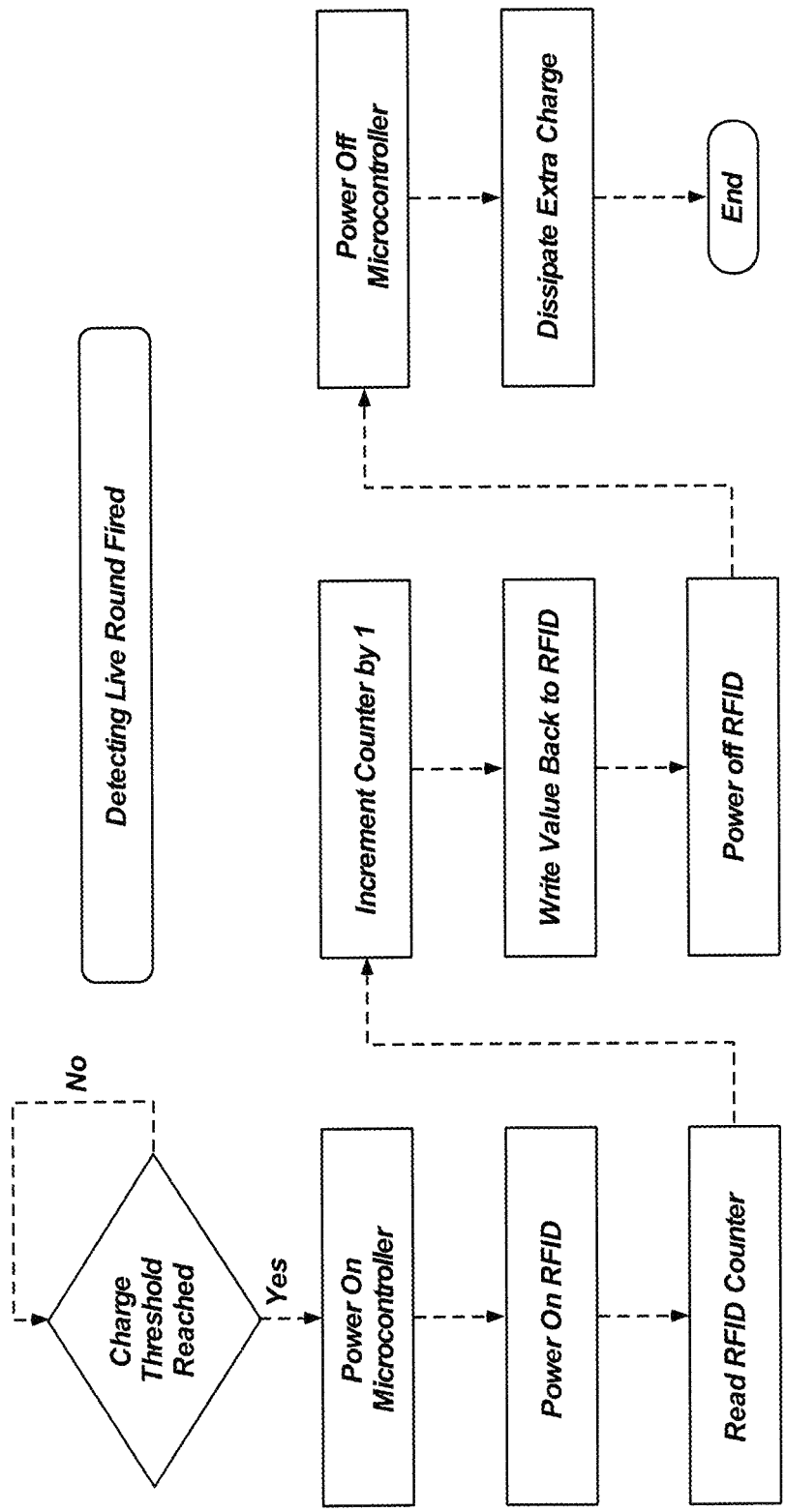
FIG. 9 is a flow chart of exemplary steps that may be taken by the system described herein to count rounds fired by a firearm.
Figure 10:
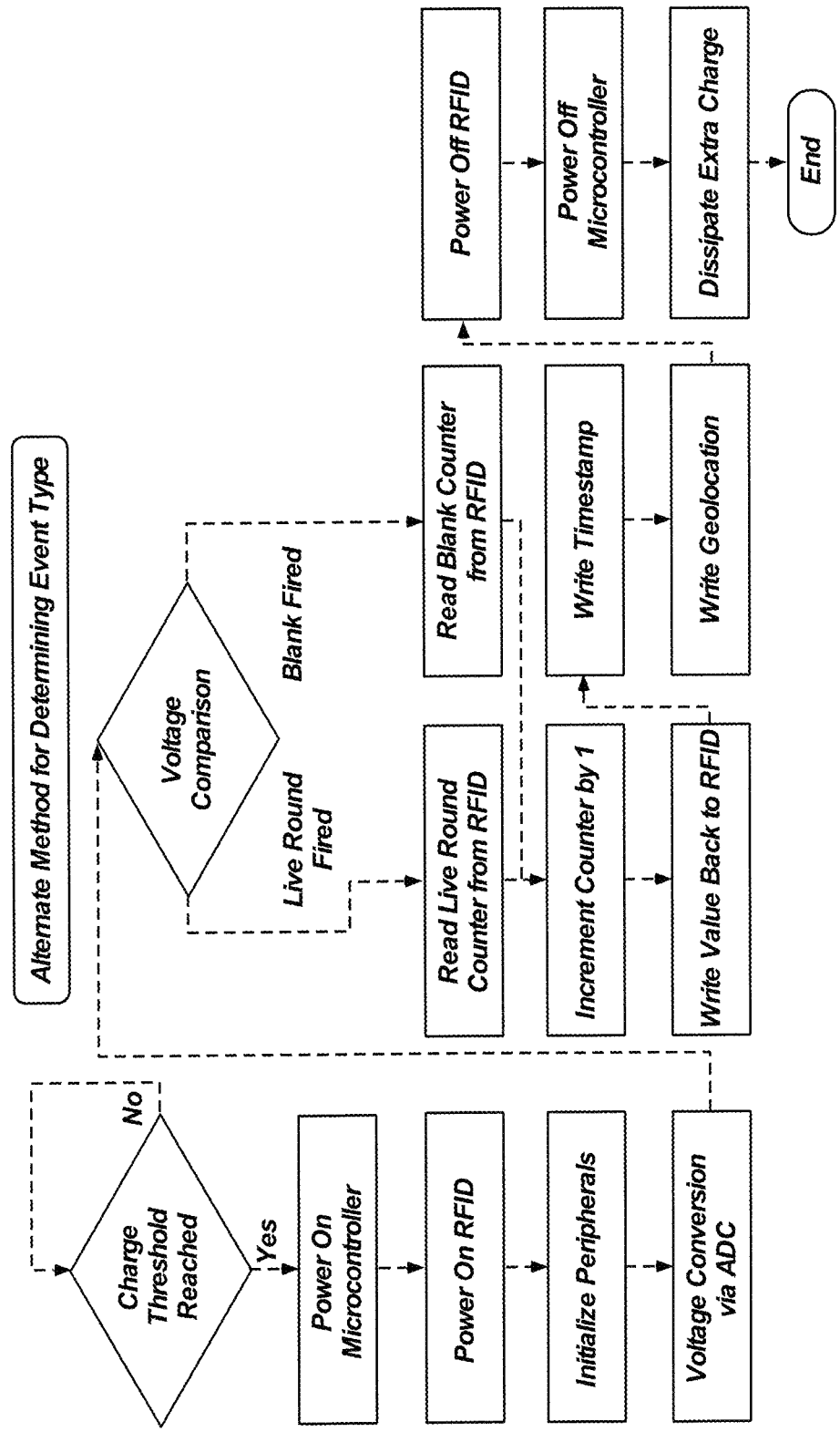
FIG. 10 is another flow chart of exemplary steps that may be taken by the system described herein to count rounds fired by a firearm.
Figure 11:
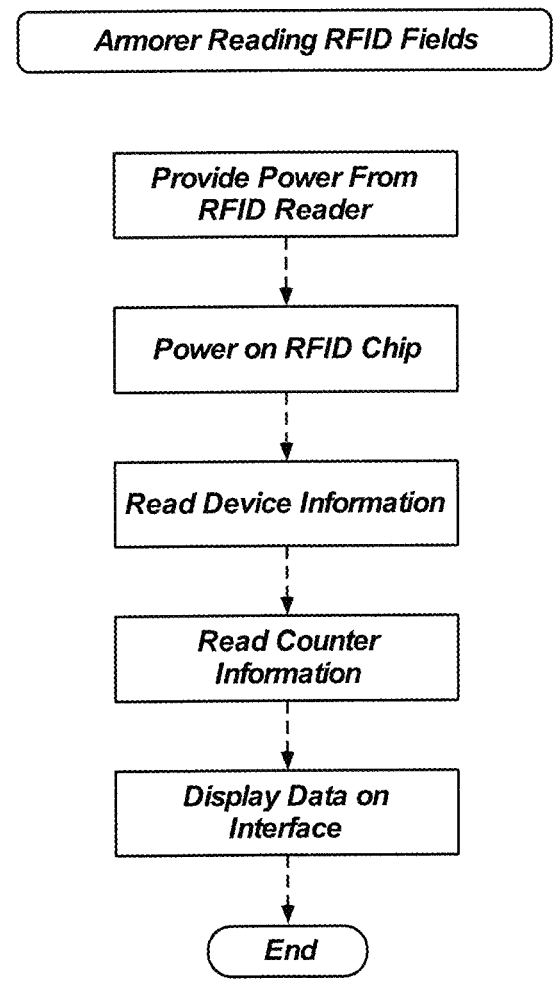
FIG. 11 is a flow chart of exemplary steps that may be taken by an armorer or the like to read data stored on an RFID chip.
Figure 12:
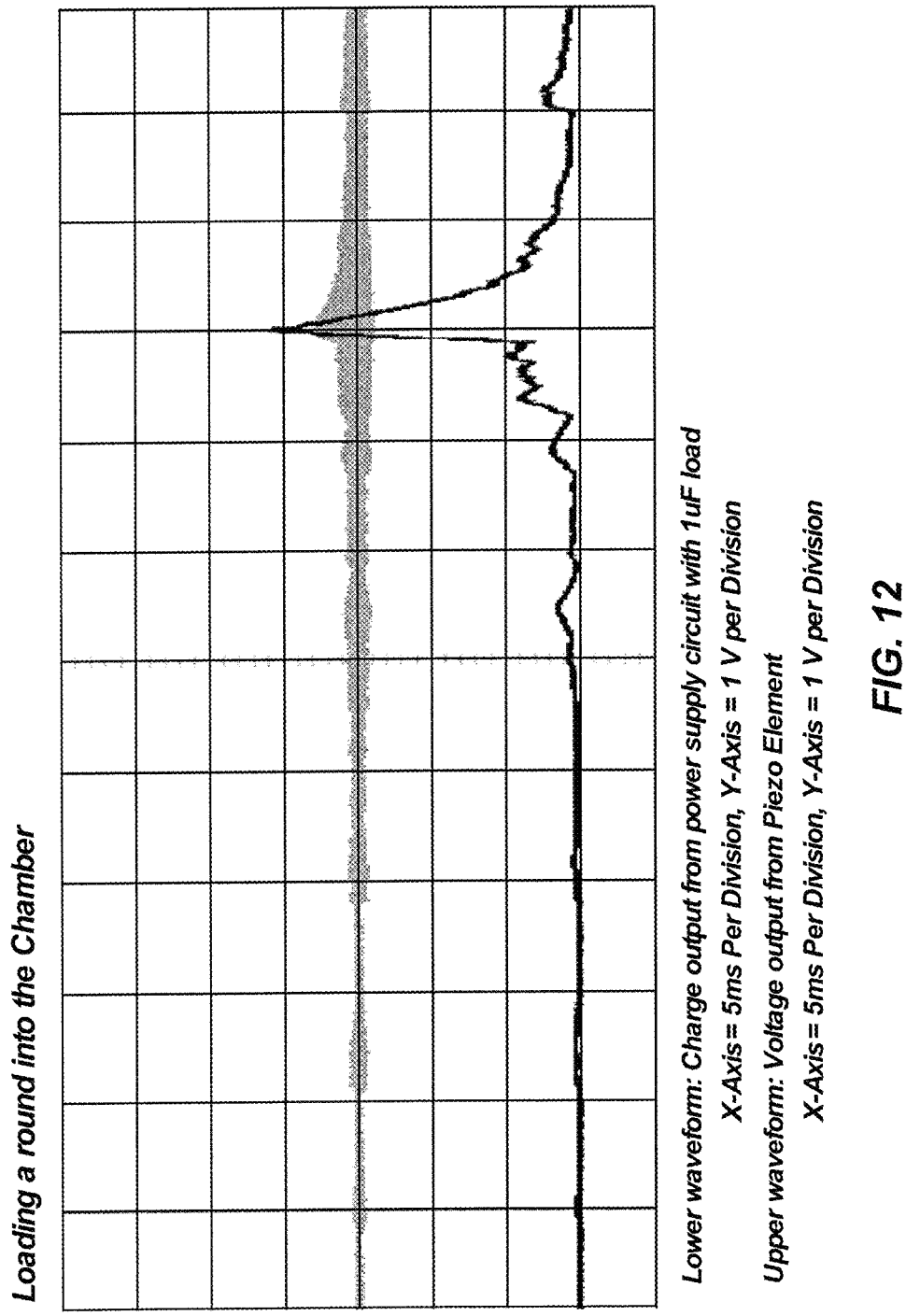
FIG. 12 is a waveform resulting from loading a round into a chamber.
Figure 13:
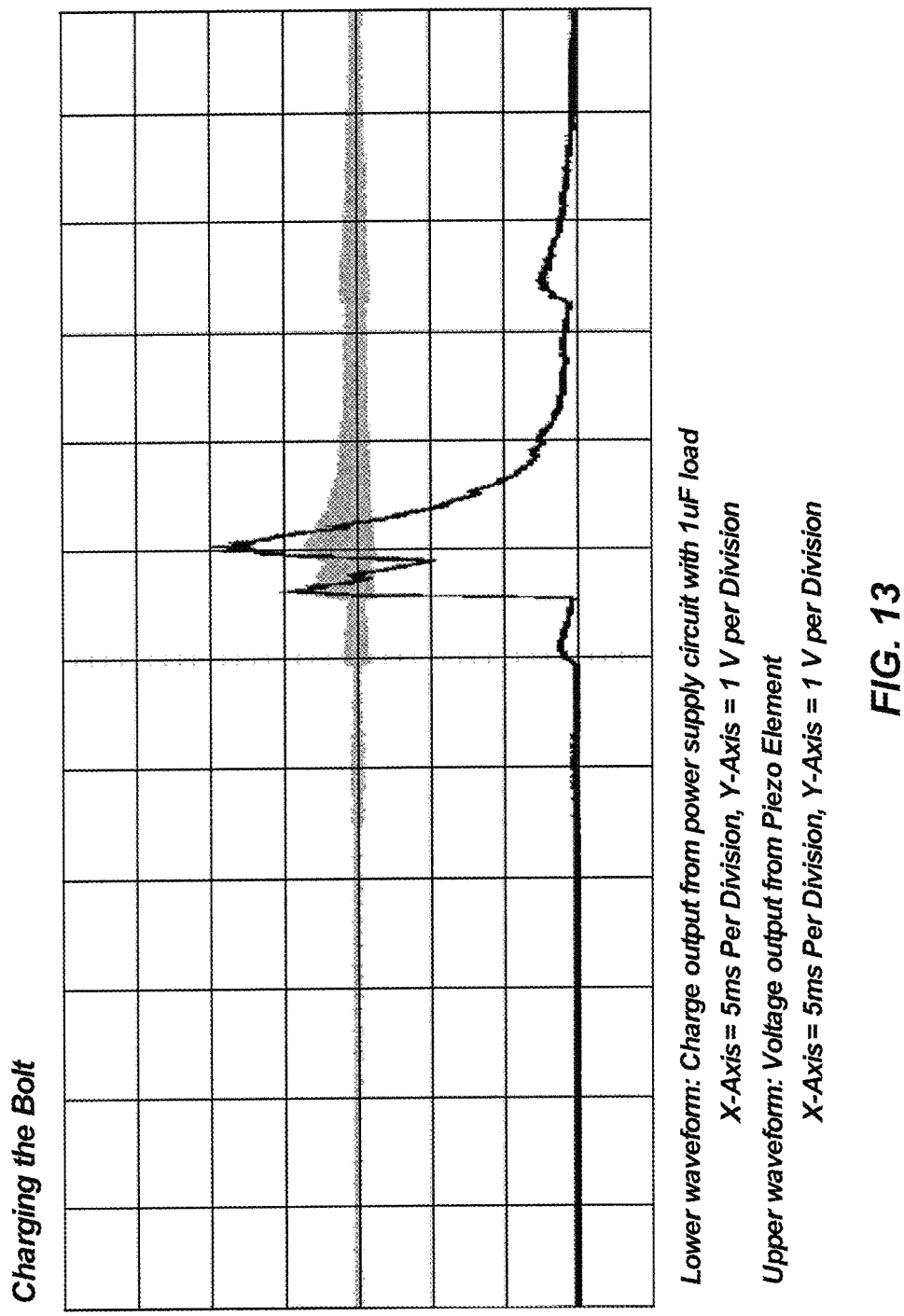
FIG. 13 is a waveform resulting from charging a bolt.
Figure 14:
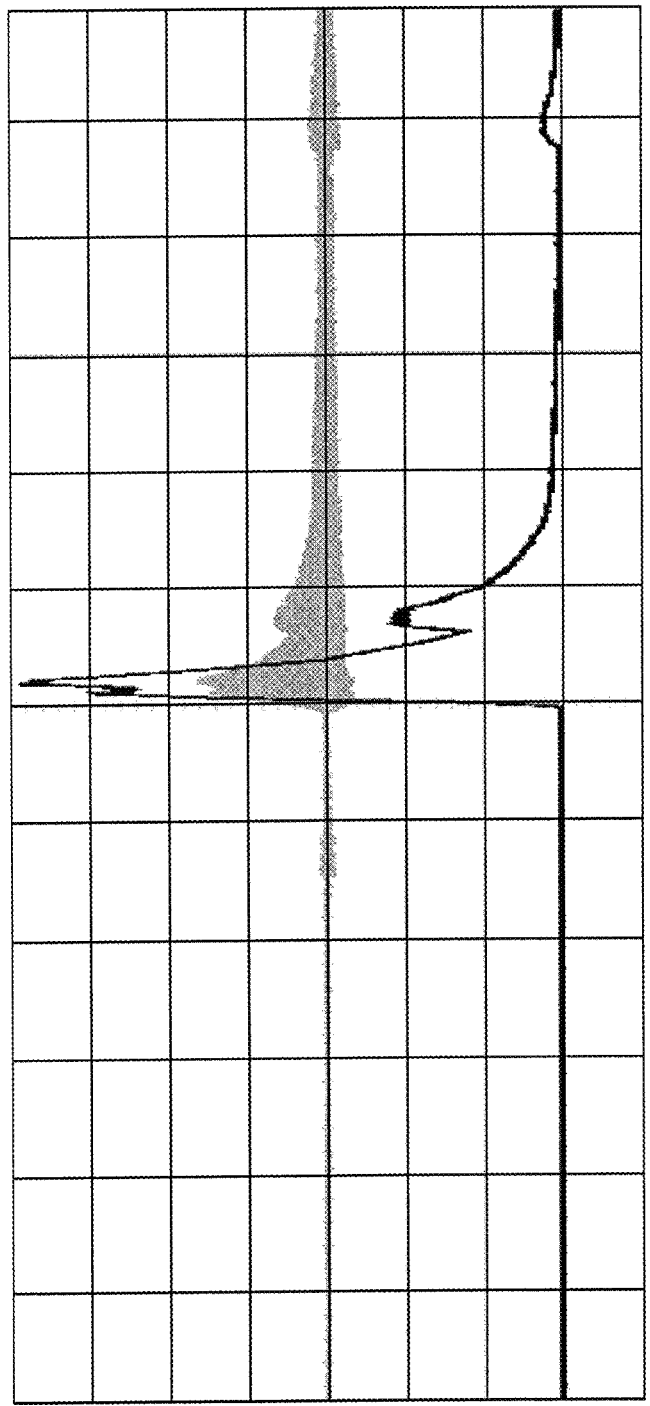
FIG. 14 is a waveform resulting from firing a live round.
Figure 15:
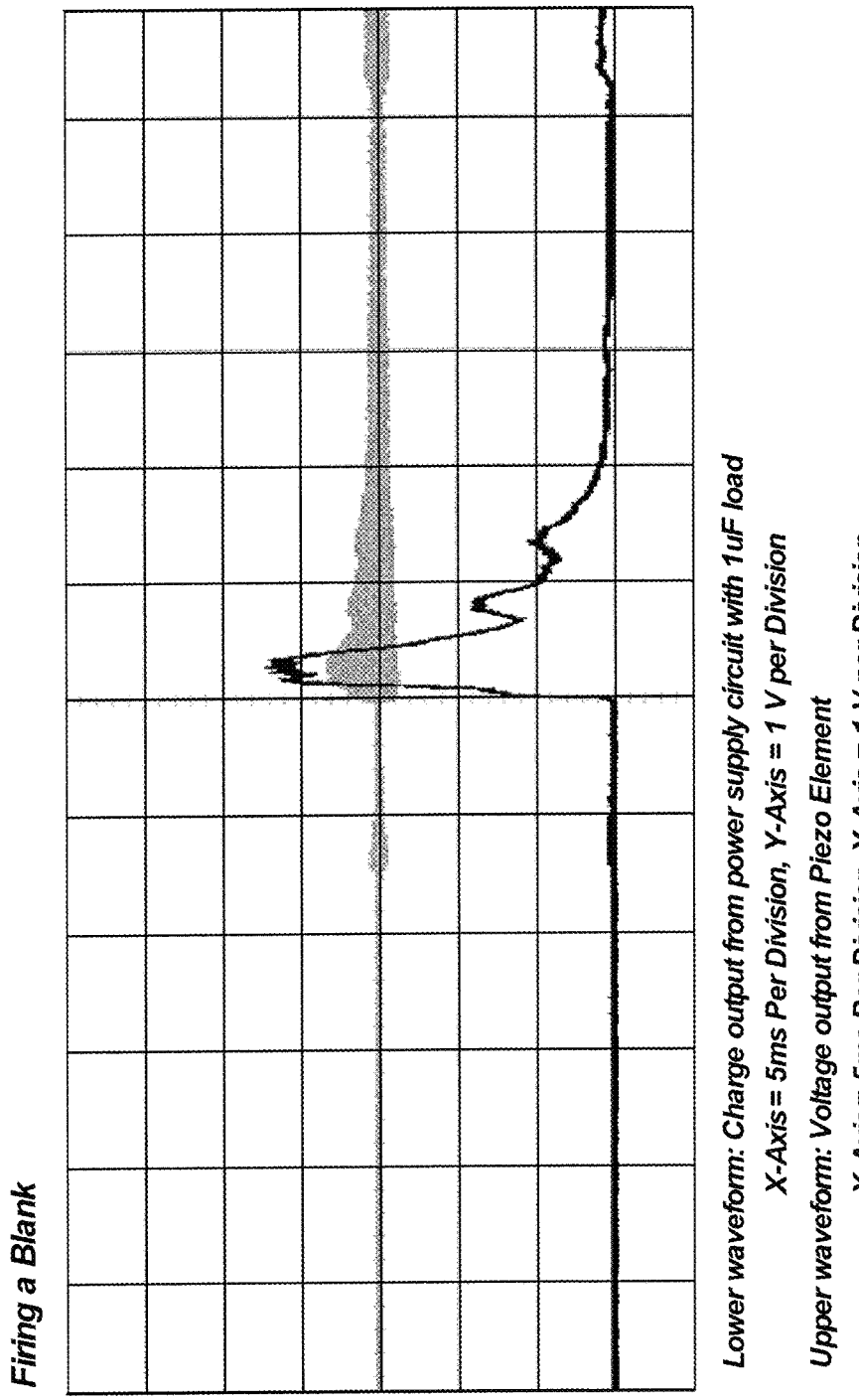
FIG. 15 is a waveform resulting from firing a blank.
Figure 16:
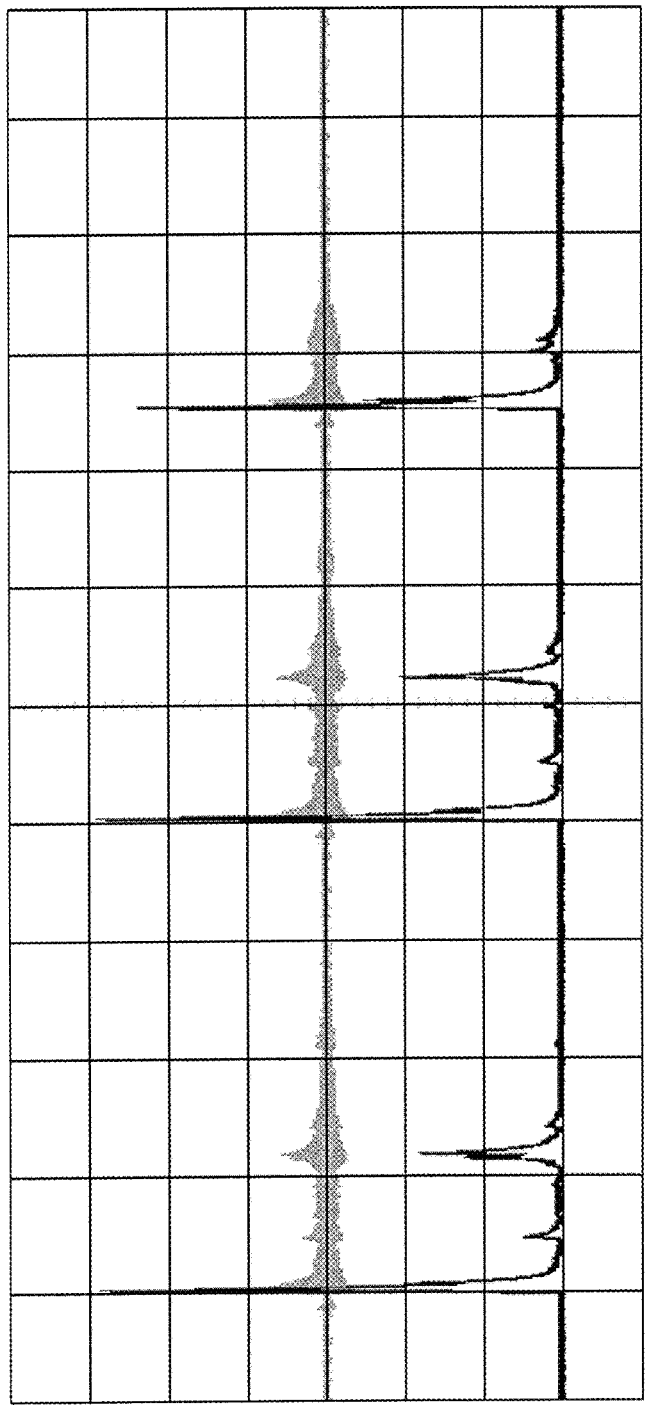
FIG. 16 is a waveform resulting from live ammunition.
Figure 17:
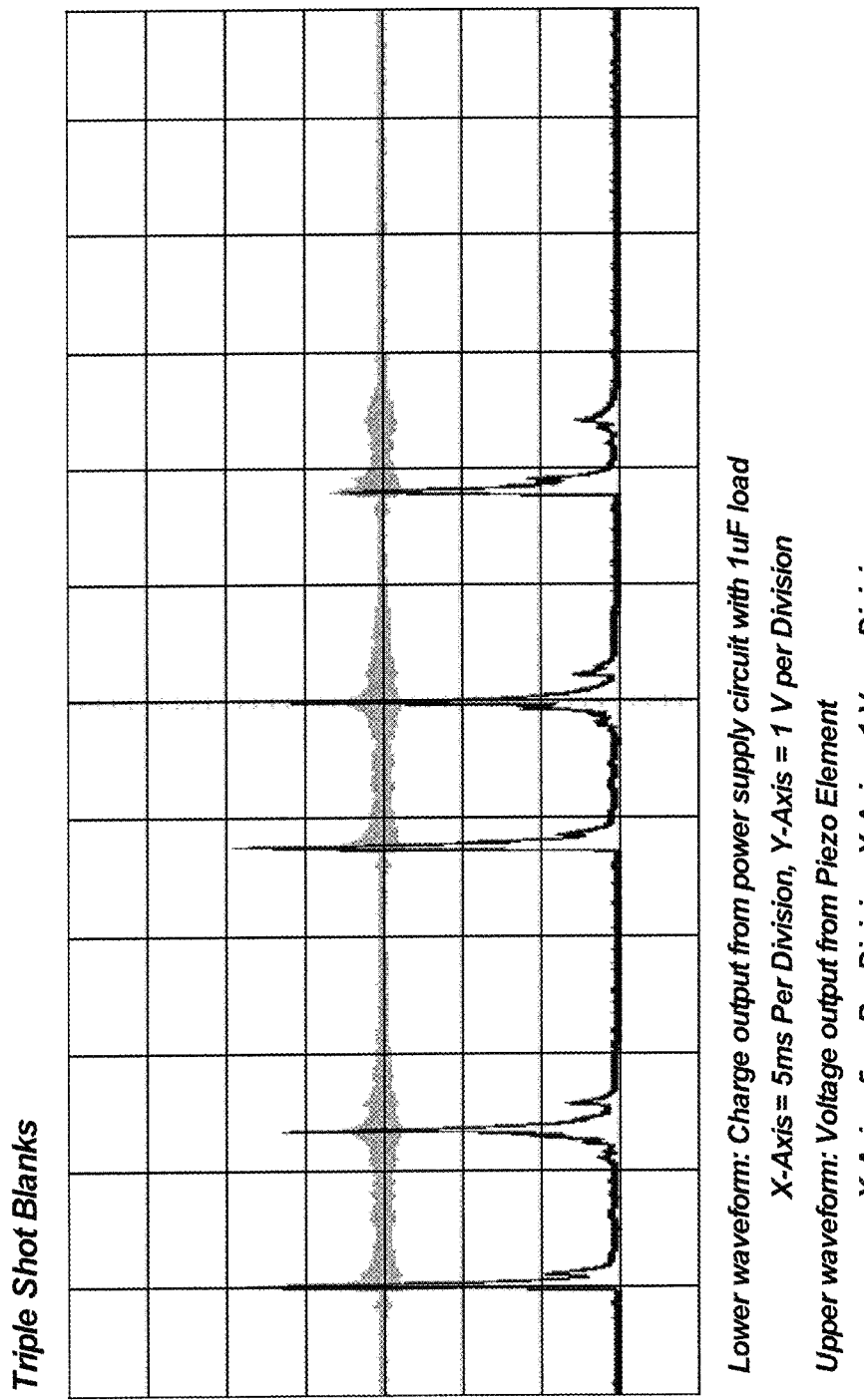
FIG. 17 is a waveform resulting from firing three rounds of blanks.

FIG. 8 shows exemplary steps which may be taken in programming the system, and FIG. 9 shows exemplary steps which may be taken to detect a live round fired. It will be appreciated that while the figures show these as discrete steps for clarity, one or more steps may be performed at the same time or substantially the same time, and that the order of the steps may be changed. FIG. 10 shows an alternate method for detecting the type of event, such as a live round fired versus a blank fired. According to the method shown in FIG. 10, additional data such as a timestamp and/or geolocation may also be written onto the RFID chip. In some configurations, the system may perform voltage waveform analysis to differentiate between shots fired, blanks fired, or other types of rounds fired. After voltage waveform analysis, the system may store the results in the RFID chip in different memory sections based on the type of shot fired. FIG. 11 shows exemplary steps an armorer may take in reading the data from an RFID chip.

FIGS. 12 through 17 show exemplary output of voltage waveforms resulting from various actions (such as loading a round into the chamber in FIG. 8 and charging the bolt in FIG. 9). This field data indicates that a low threshold of 4-5 volts may be selected in some applications. In other applications, a low threshold of 3-4 volts may be selected. It is anticipated that the low voltage threshold may be different for different applications, including variations at least for the type of firearm used and the type of piezo used.

In use, the armorer or user may first secure the mechanical mount (comprising the piezoelectric element(s) 10 and electronics controller 15) to the barrel of a firearm. It is not necessary for the armorer to attach any power supply. The armorer may then check, at any time, the value of rounds fired stored on the RFID chip. It will be appreciated that the armorer may check hundreds of values in a few seconds. As an armorer is typically in charge of hundreds of firearms, this may provide a simple and accurate method to check the number of rounds fired and the maintenance needed on each of the firearms. Because no extra power supply is needed, there is no need for changing batteries. Additionally, because only a shockwave from a round firing is able to turn on the microcontroller, the armorer can be assured there will be very few false positive counts reflected in the value stored on each RFID chip. In addition to storing the value of rounds on the RFID chip, other data such as the type of firearm and the person(s) who have checked out the firearm may be stored on the RFID chip. This data may be encrypted for privacy.

Examples

Field data testing was conducted according to the following procedures. A standard mil-spec Bushmaster AR15 rifle with standard mil-spec 16" barrel was used for all tests. The piezo element used to harvest energy from the rifle barrel consisted of a bulk piezo ceramic plate of SM111 with dimensions of 20×15×3 mm (Steminc PN SMPL20W15T3R111). This piezo element was secured to the barrel, posterior to the gas block, and anterior to the barrel nut, with a custom clamp made of T60601 aluminum, to provide solid mating surface of a curved barrel to a flat plate. The positive and negative poles of the piezo element were connected to a power supply, and to an oscilloscope to verify that the piezo element was responding to mechanical events. The power supply circuit further included a bridge rectifier, an LED which acted as a voltage regulator by requiring a minimum current before powering the rest of the circuit, a storage/charge capacitor, to store the energy produced from each event, and a 511-ohm resistor to act as a load source similar to the final circuit.

Three different charge capacitors were used to determine overall power and charge waveforms. The capacitor values used included a 0.1 uF, 1 uF and 10 uF capacitor. For each test, waveforms were captured with an NI virtual bench oscilloscope with channel 1 being connected across the 511-ohm load resistor and channel 2 being connected across the positive/negative poles of the piezo element.

Testing consisted of performing four distinct actions or events and capturing the waveform on the NI virtual bench oscilloscope. First, charging the bolt, which consisted of locking the bolt to the rear of the firearm and pressing the bolt release, allowing it to slam forward into the chamber and striking the barrel. Second, a round was loaded into the chamber of the firearm. This consisted of inserting a magazine with 5 rounds, pulling the charging handle to the rear and releasing it, allowing the bolt to slam forward and load a round into the chamber. The third action was firing a single round of XM855 5.56×45 62 gr FMJ steel core ammunition. The fourth action was firing an M200 5.56×45 blank with a UTG Gen III integral blank firing adapter to allow back pressure to cycle the bolt of the firearm. Waveforms for each test scenario were captured on multiple attempts to ensure that they produced consistent waveforms and that there was no significant variation when the specific event occurred. Additional waveforms were captured when three rounds were fired with both live ammo and blanks to show a comparison of the natural cycling of the bolt during normal shooting conditions.

Sample waveform outputs using the experimental set-up as described above are shown in FIGS. 12 through 17. For each waveform, the x-axis represents time and the y-axis represents voltage. The scaling is indicated on each figure. Channel two of the oscilloscope is shown on top and represents the output from the piezo element, while the waveform on the bottom is channel one of the oscilloscope and corresponds to the output across the power supply load resistor. Table 1 sets for the maximum output voltage of the circuit for each action, the maximum output voltage of the piezo, and the charge output (estimated by measuring the area under the curve).

TABLE I

| Action | Maximum Output Voltage of Circuit | Maximum Output Voltage peak-peak of Piezo | Charge Output (Arbitrary Units) |
|---|---|---|---|
| Loading a round | 4.2 V | 0.9 Vpp | 7.5 |
| Charging the bolt | 5.0 V | 1.0 Vpp | 12.2 |
| Firing a single round | 13.8 V | 4.0 Vpp | 22.2 |
| Firing a single blank | 4.5 V | 1.0 Vpp | 10.3 |

While some maximum output voltages may have similar values, the system may be able to tell the difference between different actions by using further waveform analysis. For example, while the output voltages for charging the bolt and firing a blank may be similar, the resulting waveforms have different properties and can be differentiated by signal analysis of the waveforms.

According to one aspect, the microcontroller may be programmed to determine the rate of change of the voltage of the waveform. Thus, rather than looking at the maximum voltage, time frame, and taking several processing steps to determine the type of event, the current system may determine the type of event (live ammunition, blank ammunition, other event, etc.) by analysis of the rate in change of the voltage. For example, the following events have markedly different rates of change in voltage (from slowest rate of change to fastest), firing a blank, charging the bolt and firing a live round. The different rates of change allow the system to function with a minimum turn on voltage and then typically two or more samples to determine how quickly the voltage is changing. These minimum samples may be all that is needed to distinguish the type of event, rather than measuring the width and peaks of the events. These rates of changes for events are a direct result of the current produced from the piezo sensor and the size of the storage capacitor used. By changing the piezo sensor and optimizing it to produce more charge for certain range of frequencies, which match that of a round being fired, it may be possible to make the differences between the rate of change for the different events even greater. Also by using a larger storage capacitor, it may decrease the rate of change due to the charge constant value.

Table II sets for some exemplary measurements of the voltage at specific times. To measure time, "0" is given as the time that the microcontroller first receives power from the voltage waveform, and time is given in microseconds. The rate of change between two or more voltages over time may be used to determine the type of event that has occurred.

TABLE II

Figure 21:
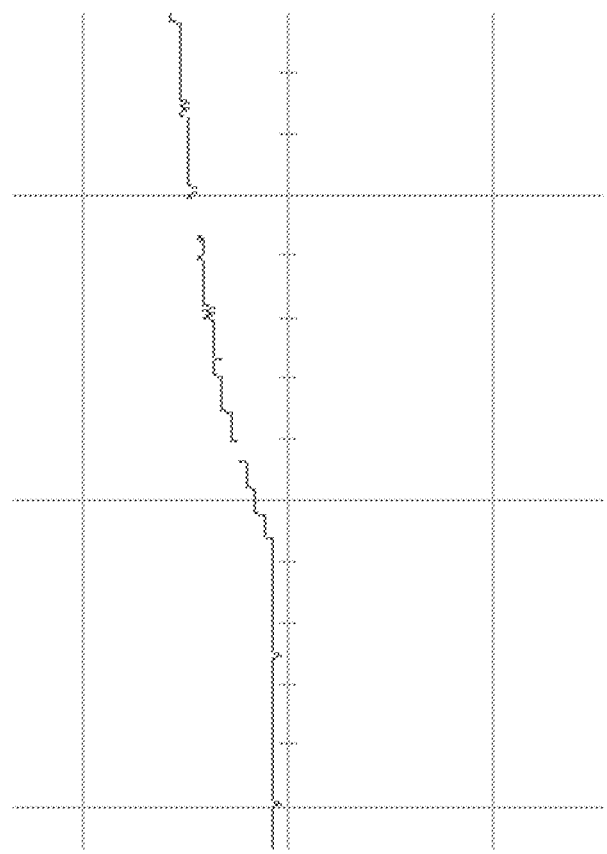
FIG. 21 is a waveform resulting from charging a bolt.
Figure 22:
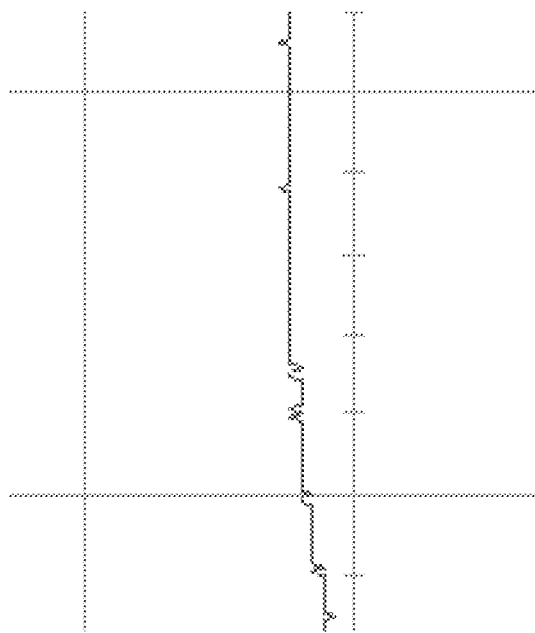
FIG. 22 is a waveform resulting from firing a blank.
Figure 23:
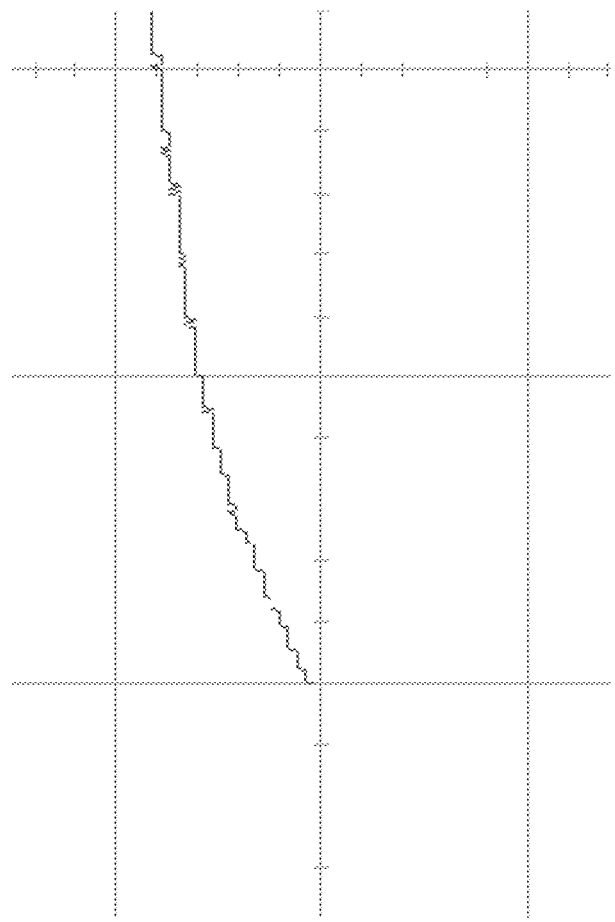
FIG. 23 is a waveform resulting from live ammunition.
Figure 24:
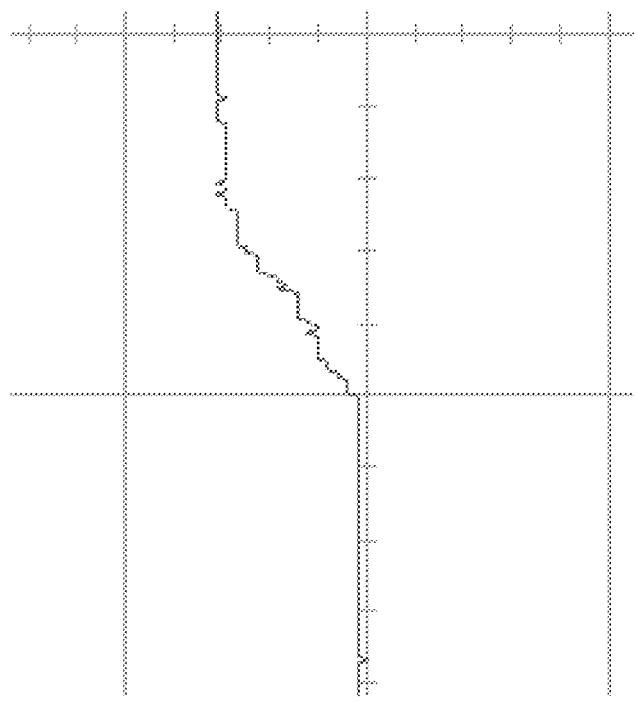
FIG. 24 is a waveform resulting from charging a bolt.
Figure 25:
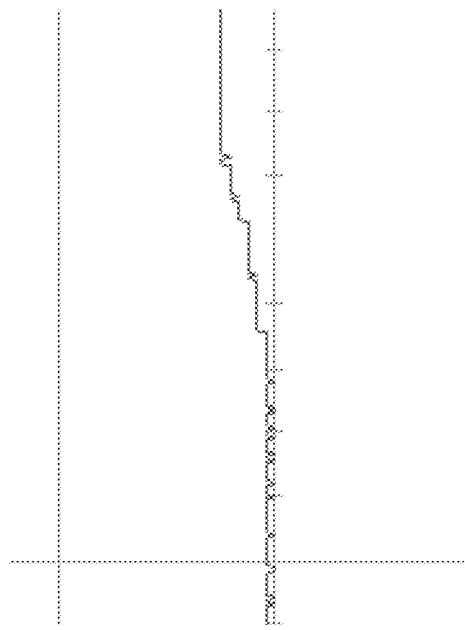
FIG. 25 is a waveform resulting from firing a blank.
Figure 26:
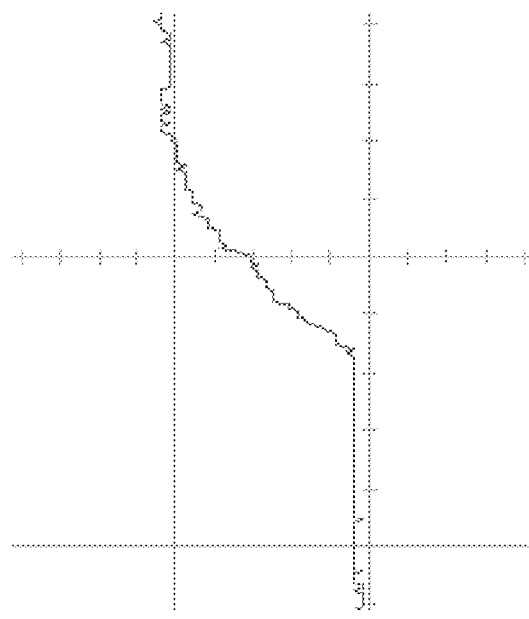
FIG. 26 is a waveform resulting from live ammunition.
Figure 27:
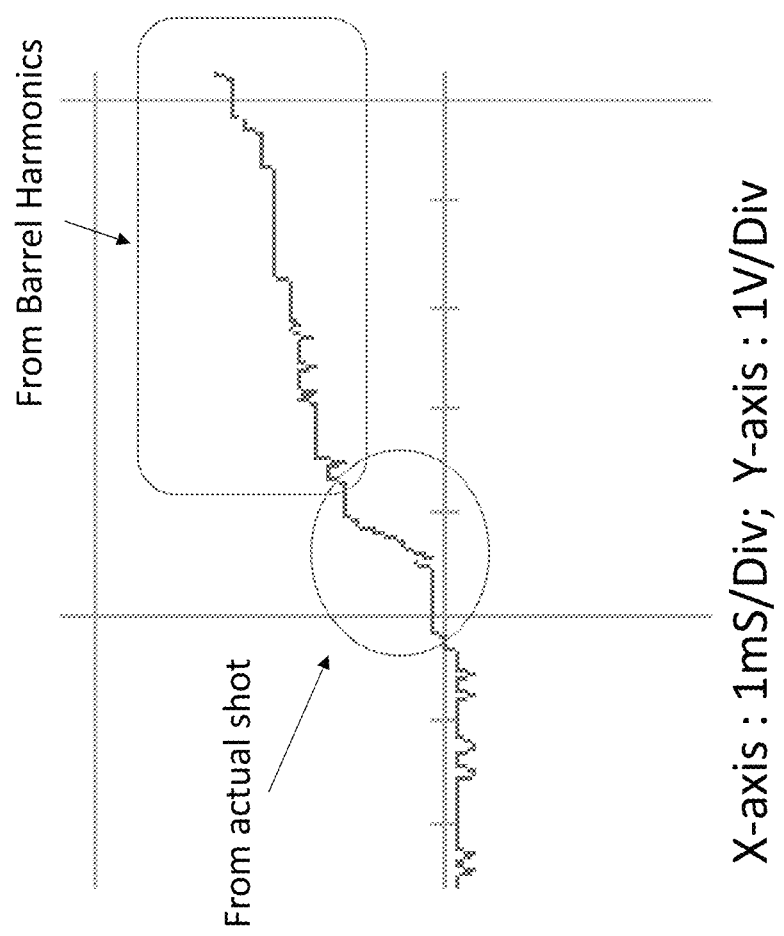
FIG. 27 is a waveform resulting from live ammunition.

| Piezo Used | Time dt (μS) | Voltage dV (mV) | Rate of Change (dV/dt) | Type of event |
|---|---|---|---|---|
| APC-1151 15 mm Diameter Disc 2.1 mm Thick 880 Material Fr = 141.3 kHz Radial Fr = 1.005 MHz Thickness 1000 Qm Mfg. APC | 500 μS | 400 mV | .800 mV/μS | Charging the Bolt (FIG. 21) |
|  | 500 μS | 300 mV | .600 mV/μS | Firing a blank (FIG. 22) |
|  | 500 μS | 550 mV | 1.1 mV/μS | Firing a live round (FIG. 23) |
| 5 SMD15T04R111 in parallel stack configuration 15 mm Diameter Disc 2 mm Thick (.4 mm Each) SM111 Material Fr = 146.67 kHz Radial Fr = 5.175 MHz Thickness 1800 Qm Mfg. Steminc | 500 μS | 600 mV | 1.2 mV/μS | Charging the Bolt (FIG. 24) |
|  | 500 μS | 180 mV | .360 mV/μS | Firing a blank (FIG. 25) |
|  | 500 μS | 820 mV | 1.64 mV/μS | Firing a live round (FIG. 26) |
|  | 100 μS | 210 mV | 2.1 mV/μS | (FIG. 27)* |

*The duration for which an actual shot exerts a force on the sensor for the 5.56 AR 16" barrel of these tests is 52 μS. During this window the rise time is drastically higher than other events, the rest of the events are much slower due to barrel harmonics.

Measuring the rate of change may improve accuracy of event detection and reduce the number of false positives, increasing the efficiency of the present system and maximizing the life of the weapon. It also simplifies the round count mechanism. The simplicity of the processing may also allow for reduced electricity needed to perform the processing (i.e., no additional batteries or other sources of power may be needed to support processing of the waveforms), reducing the overall weight of the system and further improving the efficiency. For example, a single transducer may be used as both the power source and the sensor in the present system.

According to other configurations, the RFID and/or microcontroller may further be in communication with a global positioning system transceiver (GPS), such that when the firearm is discharged, data relating to the location of the firearm may be transmitted. This may allow, for example, safety officers to determine a location of a firearm discharge and provide appropriate safety response. It will be appreciated that other data relating to the firearm may also be stored and/or transmitted, such as the name of the registered owner, type of weapon, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for determining the number of rounds fired by a firearm, the system comprising:
a piezo electric sensor for mechanical connection to the firearm, the piezo electric sensor configured to detect mechanical vibrations and output one or more voltage waveforms representing the mechanical vibrations, wherein the piezo electric sensor comprises piezo material having a mechanical quality factor of 1000 or greater;
a radio frequency identification chip;
a non-volatile memory;
a microcontroller in communication with the piezo electric sensor and the radio frequency identification chip, and wherein the microcontroller is programmed to receive the one or more voltage waveforms;
a bridge rectifier in communication with the piezo electric sensor;
a capacitor in electrical communication with the bridge rectifier and the piezo electric sensor; and
a means for regulating voltage in electrical communication to the capacitor and the microcontroller;
wherein the radio frequency identification chip is in electrical communication with the means for regulating voltage, and wherein the microcontroller is programmed to, when the microcontroller receives the one or more voltage waveforms, receive a stored value from the non-volatile memory, increment the stored value by one, and communicate the stored value back to the non-volatile memory.

2. The system of claim 1, wherein the piezo electric sensor comprises at least one of PZT-4 and PZT-5A, and wherein the piezo electric sensor is polarized to operate in radial mode.

3. The system of claim 1, wherein the microcontroller is powered only by the voltage waveforms of the piezo electric sensor.

4. The system of claim 1, wherein the microcontroller is further programmed to analyze the one or more voltage waveforms received from the piezo electric sensor.

5. The system of claim 4, wherein the microcontroller is programmed to compare the one or more voltage waveforms to a pre-determined firing voltage waveform.

6. The system of claim 5, wherein the microcontroller is further pre-programmed to determine if the voltage waveform is smaller than the pre-determined firing voltage waveform.

7. The system of claim 6, wherein the microcontroller is further programmed to, when the one or more voltage waveforms contains at least 90 percent of an area of the pre-determined firing voltage waveform, take the following steps:
read a previous round count value stored on the non-volatile memory,
increment the previous round count value by one to form an updated round count value, and
store the updated round count value on the non-volatile memory.

8. The system of claim 1, wherein the microcontroller is programmed to, when the microcontroller receives the one or more voltage waveforms, receive a stored value indicating a global position of the firearm, and communicate the stored value back to the radio frequency identification chip.

9. A method for determining the number of rounds fired by a firearm, the method comprising:
sensing, by a piezoelectric element in connection with the firearm, a vibration of the firearm, the vibration having a frequency;
outputting, by the piezoelectric element, a voltage waveform representative of the vibration;
powering a microcontroller in electrical connection with the piezoelectric element in response to the voltage waveform;
receiving, by the microcontroller, a stored value from a non-volatile memory;
determining, by the microcontroller, a rate of change of the voltage waveform, and when the rate of change is above a predetermined threshold, incrementing the stored value by one; and
communicating, by the microcontroller, the stored value back to the non-volatile memory.

10. The method of claim 9, wherein the method further comprises the step of the microcontroller receiving a first measurement of the voltage waveform as the microcontroller is powered, and the microcontroller receiving a second measurement of the voltage waveform after the microcontroller receives the stored value from the non-volatile memory.

11. The method of claim 10, wherein the microcontroller measures the rate of change of the voltage between the first measurement and the second measurement.

12. The method of claim 10, wherein the method further comprises the step of selecting the piezoelectric element, and wherein the step of selecting the piezoelectric element comprises determining a resonant frequency of the firearm at a selected location of the firearm for firing a live round, the selected location having the piezoelectric element connected thereto.

13. The method of claim 12, wherein the step of selecting the piezoelectric element comprises selecting the piezoelectric element having a resonant frequency proximal to the resonant frequency of the firearm at the selected location of the firearm for firing the live round.

14. The method of claim 12, wherein the step of selecting the piezoelectric element comprises selecting the piezoelectric element having a resonant frequency similar to the resonant frequency of the firearm at the selected location of the firearm for firing the live round.

15. The method of claim 12, wherein the step of selecting the piezoelectric element comprises selecting the piezoelectric element having a resonant frequency of about 120 to about 150 kHz.

16. The method of claim 9, wherein the step of selecting the piezoelectric element having a high mechanical quality factor comprises selecting the piezoelectric element having a mechanical quality factor of at least 1000.

17. The method of claim 10, wherein the predetermined threshold is 1 mV/µS.

18. A method for determining the number of rounds fired by a firearm, the method comprising:
- sensing, by a piezoelectric element in connection with the firearm, a vibration of the firearm;
- outputting, by the piezoelectric element, a voltage waveform representative of the vibration;
- powering a microcontroller in electrical connection with the piezoelectric element in response to the voltage waveform;
- determining, by the microcontroller, a rate of change of the voltage waveform.

* * * * *